US010657123B2

United States Patent
Banister

(10) Patent No.: US 10,657,123 B2
(45) Date of Patent: *May 19, 2020

(54) METHOD AND SYSTEM FOR REDUCING TIME-OUT INCIDENCE BY SCOPING DATE TIME STAMP VALUE RANGES OF SUCCEEDING RECORD UPDATE REQUESTS IN VIEW OF PREVIOUS RESPONSES

(71) Applicant: Richard Banister, Escondido, CA (US)

(72) Inventor: Richard Banister, Escondido, CA (US)

(73) Assignee: SESAME SOFTWARE, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/449,397

(22) Filed: Jun. 23, 2019

(65) Prior Publication Data

US 2019/0310975 A1   Oct. 10, 2019

Related U.S. Application Data

(63) Continuation-in-part of application No. 14/855,552, filed on Sep. 16, 2015.

(51) Int. Cl.
*G06F 16/23* (2019.01)
*G06F 16/2458* (2019.01)
*G06F 16/953* (2019.01)

(52) U.S. Cl.
CPC ...... *G06F 16/2379* (2019.01); *G06F 16/2477* (2019.01); *G06F 16/953* (2019.01)

(58) Field of Classification Search
CPC .. G06F 16/237; G06F 16/953; G06F 16/2477; G06F 16/2379
USPC .................................. 707/609, 703, 999.204
See application file for complete search history.

(56) References Cited

U.S. PATENT DOCUMENTS

| | | |
|---|---|---|
| 5,721,918 A | 2/1998 | Nilsson |
| 6,208,990 B1 | 3/2001 | Suresh et al. |
| 6,564,215 B1 | 5/2003 | Hsiao |
| 6,850,947 B1 | 2/2005 | Chung et al. |
| 7,293,027 B2 | 11/2007 | Margolus |
| 7,330,997 B1 | 2/2008 | Odom |
| 7,774,315 B1 | 8/2010 | Galker |
| 7,822,717 B2 | 10/2010 | Kapoor |
| 8,099,392 B2 | 1/2012 | Paterson |

(Continued)

*Primary Examiner* — Dung K Chau
(74) *Attorney, Agent, or Firm* — Patrick Reilly

(57) ABSTRACT

A system and method to reduce the incidence of communications network time outs by tailoring the time length specified by an initial date time stamp and an ending date time stamp ranges of a new record update query request to be less likely to direct a responding system(s) to responsively communicate a count of individual record updates and/or a combined information volume that overburdens a communications channel, protocol or mode to cause a time-out. The number of record updates received in response to previous update queries are observed. In view of these observed query responses, the date time stamp ranges of the new update requests specified by the initial date time stamp and the ending date time of a new potential query are limited in magnitude to be unlikely to cause responding messages to contain a higher quantity of record updates than a preselected quantity of record updates and/or data volume.

21 Claims, 24 Drawing Sheets

(56) References Cited

U.S. PATENT DOCUMENTS

| | | |
|---|---|---|
| 8,117,165 B1 | 2/2012 | Winckelmann |
| 8,311,988 B2 | 11/2012 | Cisler et al. |
| 8,442,951 B1 | 5/2013 | Brannon |
| 8,666,944 B2 | 3/2014 | Beatty |
| 9,286,166 B2 | 3/2016 | Paterson |
| 9,454,587 B2 | 9/2016 | Lyons |
| 9,547,564 B1 | 1/2017 | Troutman et al. |
| 9,831,787 B1 | 11/2017 | Yueh |
| 10,117,047 B1 | 10/2018 | Chowdhury |
| 10,459,709 B1 | 10/2019 | Troutman et al. |
| 2002/0138376 A1 | 9/2002 | Hinkle |
| 2002/0161784 A1 | 10/2002 | Tarenskeen |
| 2003/0120625 A1 | 6/2003 | Jackson |
| 2004/0078228 A1 | 4/2004 | Fitzgerald |
| 2004/0203728 A1 | 10/2004 | Schwinke et al. |
| 2004/0236796 A1 | 11/2004 | Bhatt |
| 2005/0055518 A1 | 3/2005 | Hochberg |
| 2005/0055519 A1 | 3/2005 | Stuart |
| 2006/0179155 A1 | 8/2006 | Bunting |
| 2007/0100913 A1 | 5/2007 | Sumner |
| 2007/0136381 A1 | 6/2007 | Cannon |
| 2007/0185937 A1 | 8/2007 | Prahlad |
| 2008/0263007 A1 | 10/2008 | Schmidt |
| 2008/0307345 A1 | 12/2008 | Hart |
| 2008/0307347 A1 | 12/2008 | Gisler |
| 2009/0150477 A1* | 6/2009 | McClanahan ....... G06F 16/1744 709/203 |
| 2009/0249005 A1 | 10/2009 | Bender |
| 2009/0313311 A1* | 12/2009 | Hoffmann ........... G06F 11/2094 |
| 2010/0082553 A1 | 4/2010 | Beatty |
| 2010/0318495 A1 | 12/2010 | Yan |
| 2011/0167148 A1 | 7/2011 | Bodziony et al. |
| 2012/0005174 A1* | 1/2012 | Vora .................... G06F 11/3684 707/703 |
| 2012/0124081 A1 | 5/2012 | Ebrahimi |
| 2012/0221522 A1 | 8/2012 | Allman et al. |
| 2013/0036089 A1 | 2/2013 | Lucas |
| 2013/0191523 A1 | 7/2013 | Yan |
| 2013/0212599 A1 | 8/2013 | Giampaolo |
| 2013/0238552 A1 | 9/2013 | Salb |
| 2013/0275379 A1 | 10/2013 | Trebas |
| 2014/0006357 A1 | 1/2014 | Davis |
| 2014/0007239 A1 | 1/2014 | Sharpe |
| 2014/0074790 A1 | 3/2014 | Berman |
| 2014/0229506 A1 | 8/2014 | Lee |
| 2015/0066865 A1 | 3/2015 | Yara |
| 2015/0142751 A1 | 5/2015 | Bruce |
| 2015/0163206 A1 | 6/2015 | McCarthy |
| 2015/0205850 A1 | 7/2015 | Lu |
| 2015/0331755 A1 | 11/2015 | Morgan |
| 2016/0352815 A1 | 12/2016 | Mozolewski |
| 2019/0050456 A1* | 2/2019 | Gupta .................... G06F 16/951 |
| 2019/0130468 A1* | 5/2019 | Lerman ............. G06Q 30/0625 |

* cited by examiner

REC.001

| REC.ID.001 | REC.DATA.001 | DTS.001 |

REC.002

| REC.ID.002 | REC.DATA.002 | DTS.002 |

REC.N

| REC.ID.N | REC.DATA.N | DTS.N |

UREQ.001

| UREQ.ID.001 | RDB.ADDR | APP.ADDR | UREQ.COM | T0 | TR |

UMSG.001

| UMSG.ID.001 | APP.ADDR | RDB.ADDR | UCOUNT |
|---|---|---|---|
| T0 | TR | UREQ.ID.001 | |

DR.REQ.001

| DR.REQ.ID.001 | RDB.ADDR | APP.ADDR | DR.COM | T0 | TR |

DLOAD.001

| DLOAD.ID.001 | APP.ADDR | RDB.ADDR | REC.001 |
|---|---|---|---|
| REC.003 | REC.100 | REC.200 | REC.N |

TLOAD.001

| TLOAD.ID.001 | LDB.ADDR | APP.ADDR | REC.001 |
|---|---|---|---|
| REC.003 | REC.100 | REC.200 | REC.N |

METHOD AND SYSTEM FOR REDUCING TIME-OUT INCIDENCE BY SCOPING DATE TIME STAMP VALUE RANGES OF SUCCEEDING RECORD UPDATE REQUESTS IN VIEW OF PREVIOUS RESPONSES

CO-PENDING PATENT APPLICATIONS

The present Application for patent is a Continuation-in-Part Application from U.S. Nonprovisional patent application Ser. No. 14/855,552, titled "System and Method for Time Parameter Based Database Restoration" as filed Sep. 16, 2015 by Applicant of the present Application Inventor Richard Banister. The present Application incorporates in its entirety said U.S. Nonprovisional patent application Ser. No. 14/855,552 and claims benefit of the priority date of said U.S. Nonprovisional patent application Ser. No. 14/855,552.

FIELD OF THE INVENTION

The present invention relates to the relatedness of two or more databases that are at least uni-directionally communicatively coupled within an electronics communications network. More particularly, the invented method relates to revising records of a database by downloading data via an electronics communications network.

BACKGROUND OF THE INVENTION

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. The prior art enables the updating of records of a software database by downloading updates associated with one or more identified records of the recipient software database. In prior art methods, the quantity of information eligible for downloading to update a recipient database is not optimally estimated or determined by a requesting server in setting a parametric range specified within a record update transmission request. Furthermore, the prior art fails to provide systems and methods that best reduce the incidence of time-outs caused by responses to information requests, wherein the responses to information requests overburden a communications channel, protocol or mode.

There is therefore a long-felt need to provide a method and system that reduce the incidence of time-outs caused by responses to record update requests, wherein the responses to record update requests overburden a communications channel, protocol or mode.

SUMMARY AND OBJECTS OF THE INVENTION

Towards these objects and other objects that will be made obvious in light of the present disclosure, a system and method are provided that enable the selection of database records for download from a source database source and for transfer to a recipient database on a criterion of each record selected for download being associated with a date time stamp value falling within a bounded time range. The specifically bounded time period of the method of the present invention (hereinafter, "the invented method") may optionally be selected to limit the number of data records selected for download in a particular action to those records that are individually associated with date time stamp values falling within the specified time period. This limitation of records selected for inclusion in a download process to data records having associations with date time stamps falling within a limited time range reduces a likelihood of overload in transferring data and thereby reduces the incidence of time-outs in the communication of a source database, any intermediary server or software action, and the recipient database in an updating of the recipient database to reflect a current state of the source database. In certain alternate preferred embodiments of invented method, a plurality of threads may be employed to contemporaneously download records associated with date time stamps having values within a requested time range whereby data records may be downloaded in parallel.

Certain alternate preferred embodiments of the invented system comprise one or more of the aspects of establishing a database management software at a database server, the DBMS adapted to update a first database of the database server with information received from a remote server; b. the application server receiving a first plurality of counts of database record updates that have been received by the application server in a first plurality of responses corresponding to a previous first plurality of database record update requests and within a first plurality of date time stamp delta values of the previous first plurality of responses; c. deriving a date time range value in view of the first plurality of date time stamp delta values and an observed first plurality of record update quantities of the first plurality of counts of database record updates; and d. applying the date time range value for use in a new database record update request to establish a date time stamp range of the new database record update request. The system and method generate a forecast of the number record updates and/or aggregate information volume that will be provided on a per unit time basis in response to a delta of time value established between an initial date time stamp value and an ending date time stamp value of a potential new record update query.

One's understanding of at least one preferred embodiment of the invented method may be improved by consideration of the strategic approach appropriate to changing the gears of a bicycle while traversing a variable slope. The road is easier to traverse if one moves to downshift when a steep section is anticipated and to upshift when a straight or downhill section is anticipated. To formulate a strategy for how the gears should be shifted and when, the bicycle rider may anticipate conditions by looking at the road ahead, may also rely on knowledge of the area based on previous excursions, or could also anticipate a next road section based on experience of traversing the immediately previous sections of road. As the rider experiences the change in slope of the road as perceived by difficulty in rotating the foot pedals of the bicycle, the rider may apply this sensory input to anticipate whether a next 360-degree pedal rotation will require more force or less force than the one or more recent pedal rotations. Similarly, the present invention seeks to adjust a date-time stamp duration range specified in de novo database queries based upon an analysis of variable conditions pertaining to the data records and the downloading context of previous queries of a same database, wherein the instant database queries are generally bound by a unique beginning date-time stamp value and a unique ending date time stamp value, thereby resulting in generating a range of date-time stamp values to be included in the de novo query. The invented method thereby enables a more productive database update downloading process that more reliably results in the enquiring system or entity receiving in response to database queries (a.) a desirable count of record revisions, (b.) a desirable count of record elements, and/or (c.) a desirable volume of information contained in or related to records of the instant database.

According to an optional aspect of the invented method, the download process may be executed by a multi-threaded technique, wherein the record updates associated with the actually applied time period of a resultant download process are substantively near-simultaneously downloaded to the recipient database via the activity of a plurality of individual threads.

According to an additional optional aspect of the invented method, the source database is directed by an external server to generate record update counts.

According to another optional aspect of the invented method, an application server external from the recipient database may determine the resultant time period by querying the source database for relevant record update counts. This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

INCORPORATION BY REFERENCE

All publications, patents, and patent applications mentioned in this specification are herein incorporated by reference to the same extent as if each individual publication, patent, or patent application was specifically and individually indicated to be incorporated by reference. U.S. Pat. No. 9,754,001 titled "Method of integrating remote databases by automated client scoping of update requests prior to download via a communications network" issued on Sep. 5, 2017 to Inventors Banister, R. and Dubberley, W.; U.S. Pat. No. 10,089,333 titled "Method and system for dynamically modifying database metadata and structures" issued on Oct. 2, 2018 to Inventors Banister, R., and Dubberley, W.; and U.S. Pat. No. 10,003,634 titled "Multi-threaded download with asynchronous writing" issued on Jun. 19, 2018 to Inventors Banister, R. and Dubberley, W. are incorporated herein by reference in their entirety and for all purposes.

BRIEF DESCRIPTION OF FIGURES

These, and further features of the invention, may be better understood with reference to the accompanying specification and drawings depicting the preferred embodiment, in which.

1 generates and applies a forecast of the number record updates and/or aggregate information volume that will be provided on a per unit time basis in response to a delta of time value established between an initial date time stamp value and an ending date time stamp value of a potential new record update query.

Figure 1:
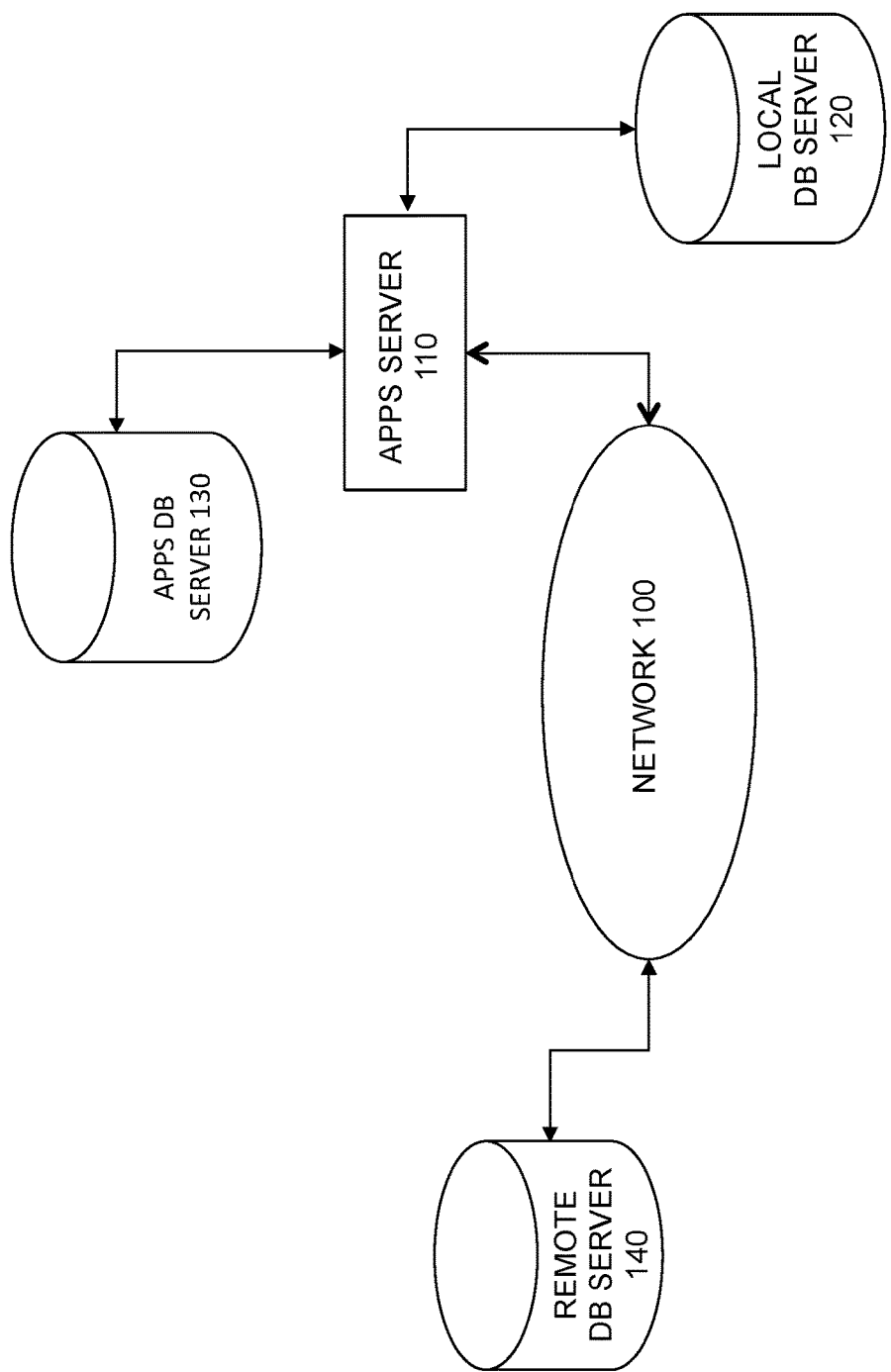
FIG. 1 is a diagram of an electronic communications network comprising a remote database server, an application server, an alternate application database server, and a local database server.
Figure 16:
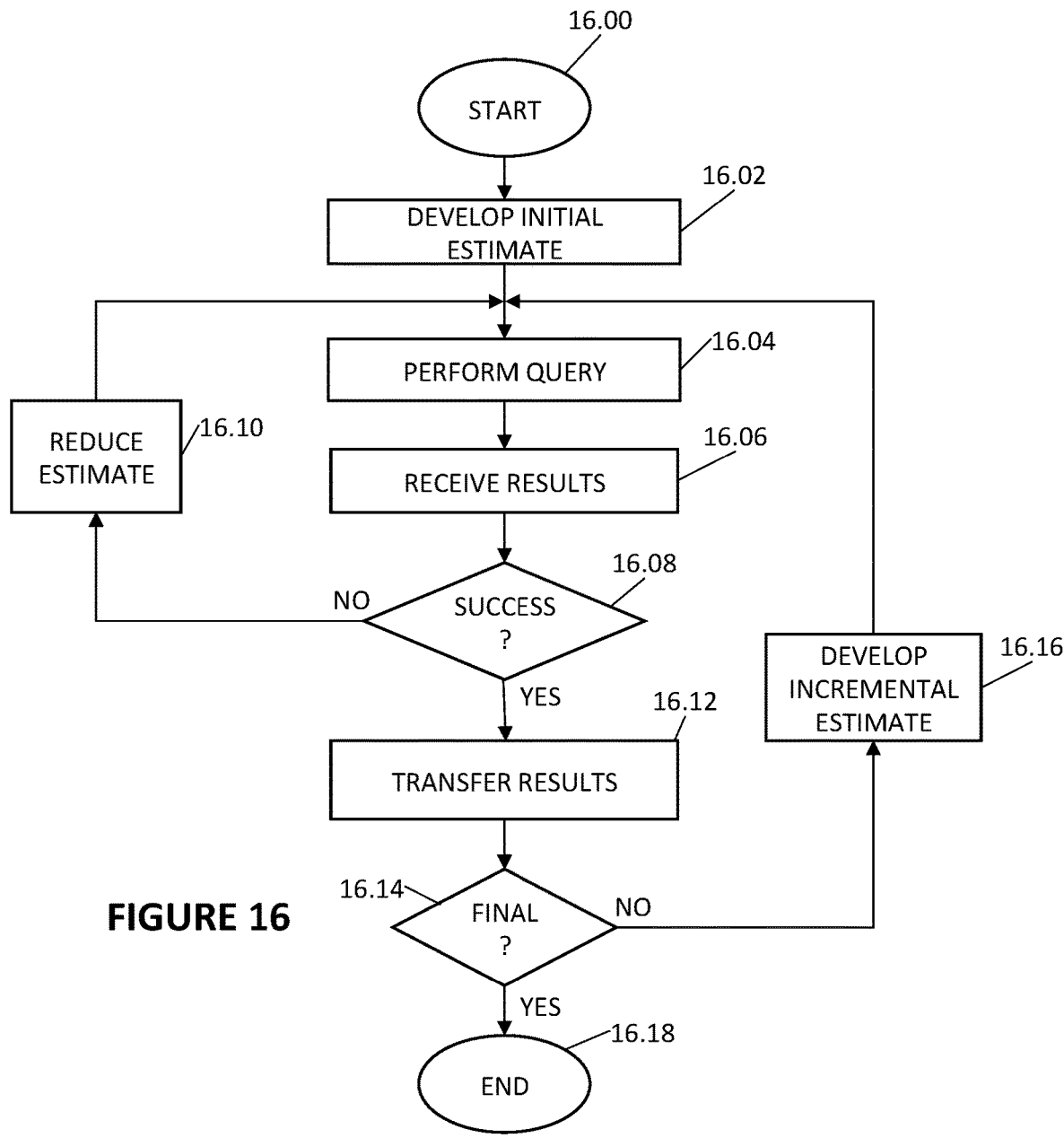
FIG. 16 is a flow chart of an alternate embodiment of the invented method wherein the local database server of FIG.
Figure 17:
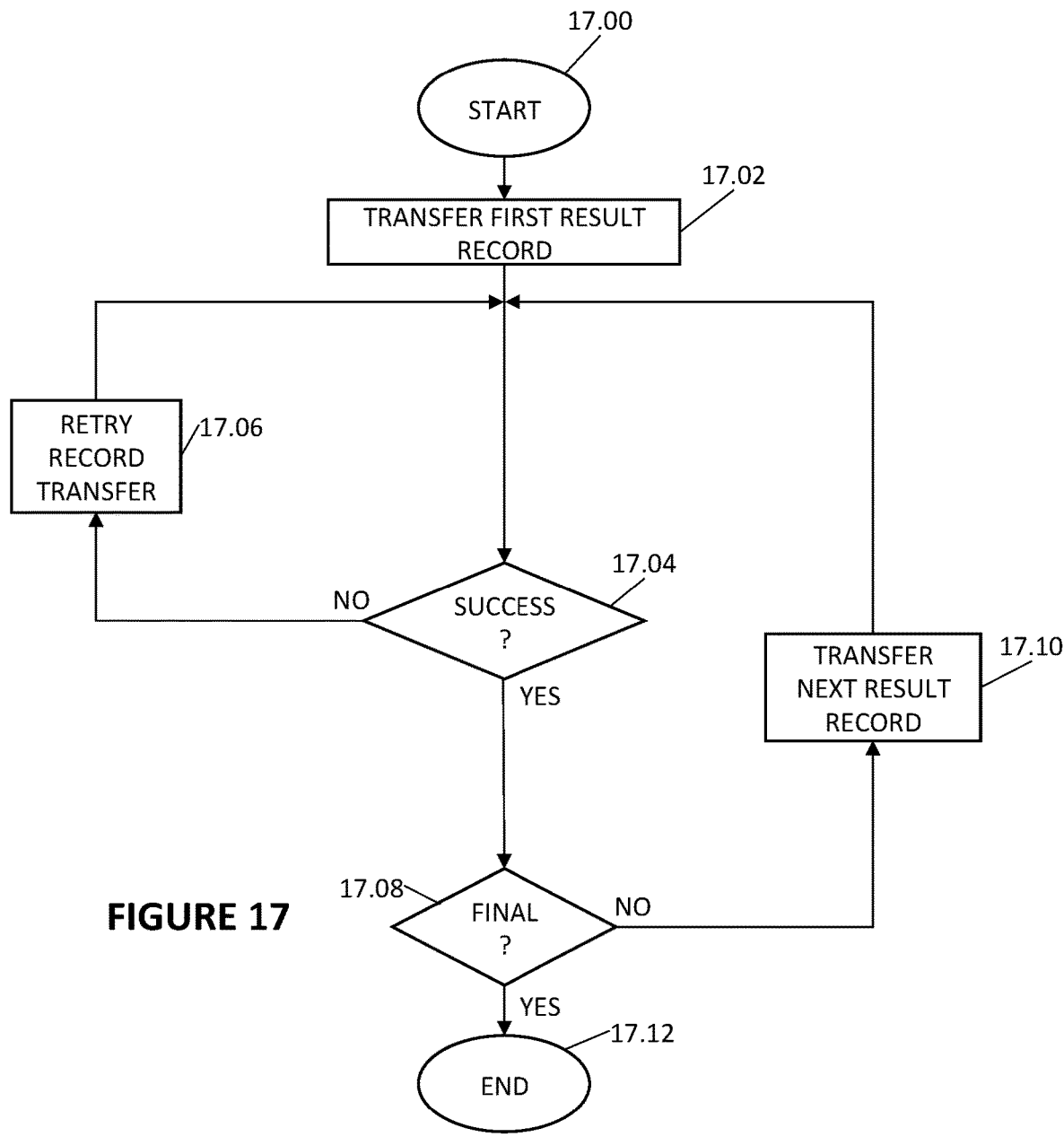

FIG. 17 is a flowchart of one preferred embodiment of element 16.12 of FIG. 16 where the records transferred to the local database server of FIG. 1 are transferred one record at a time.

Figure 18:
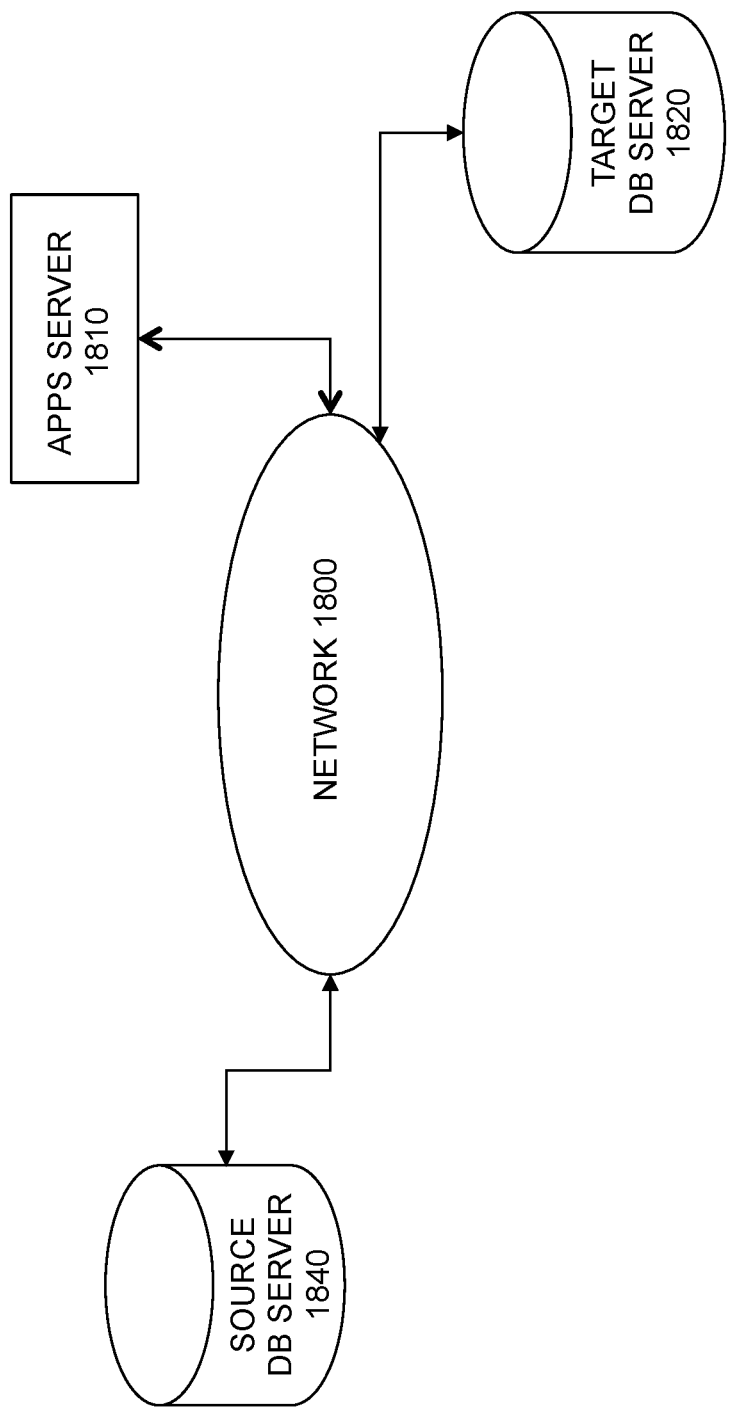

FIG. 18 is a diagram of an electronic communications network comprising a remote source database server, an application server, and a remote target database server.

Figure 19:
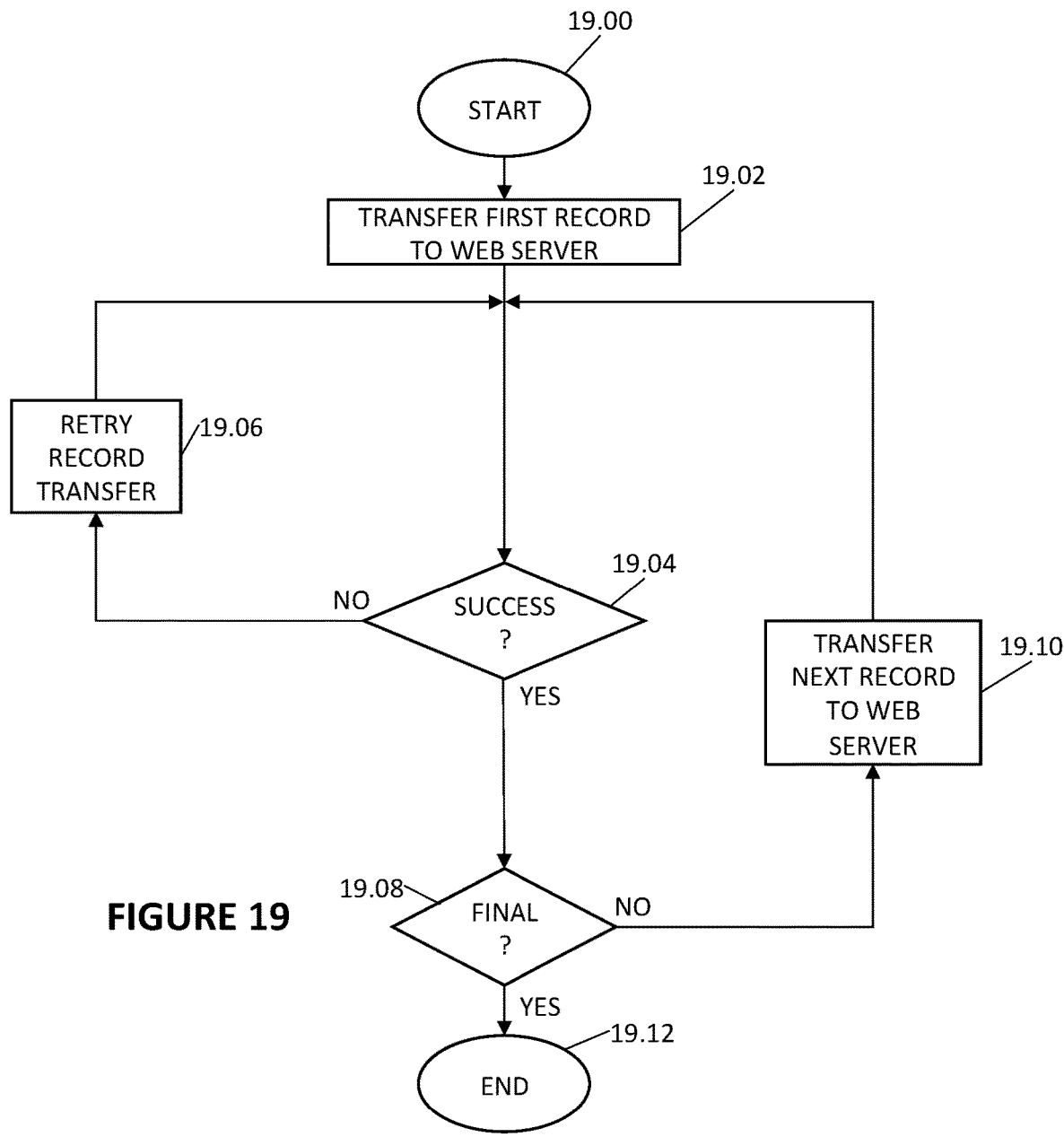

FIG. 19 is a flowchart of one preferred embodiment of element 16.12 of FIG. 16 where the records transferred to the local database server of FIG. 1 are instead transferred to a remote target database.

Figure 20:
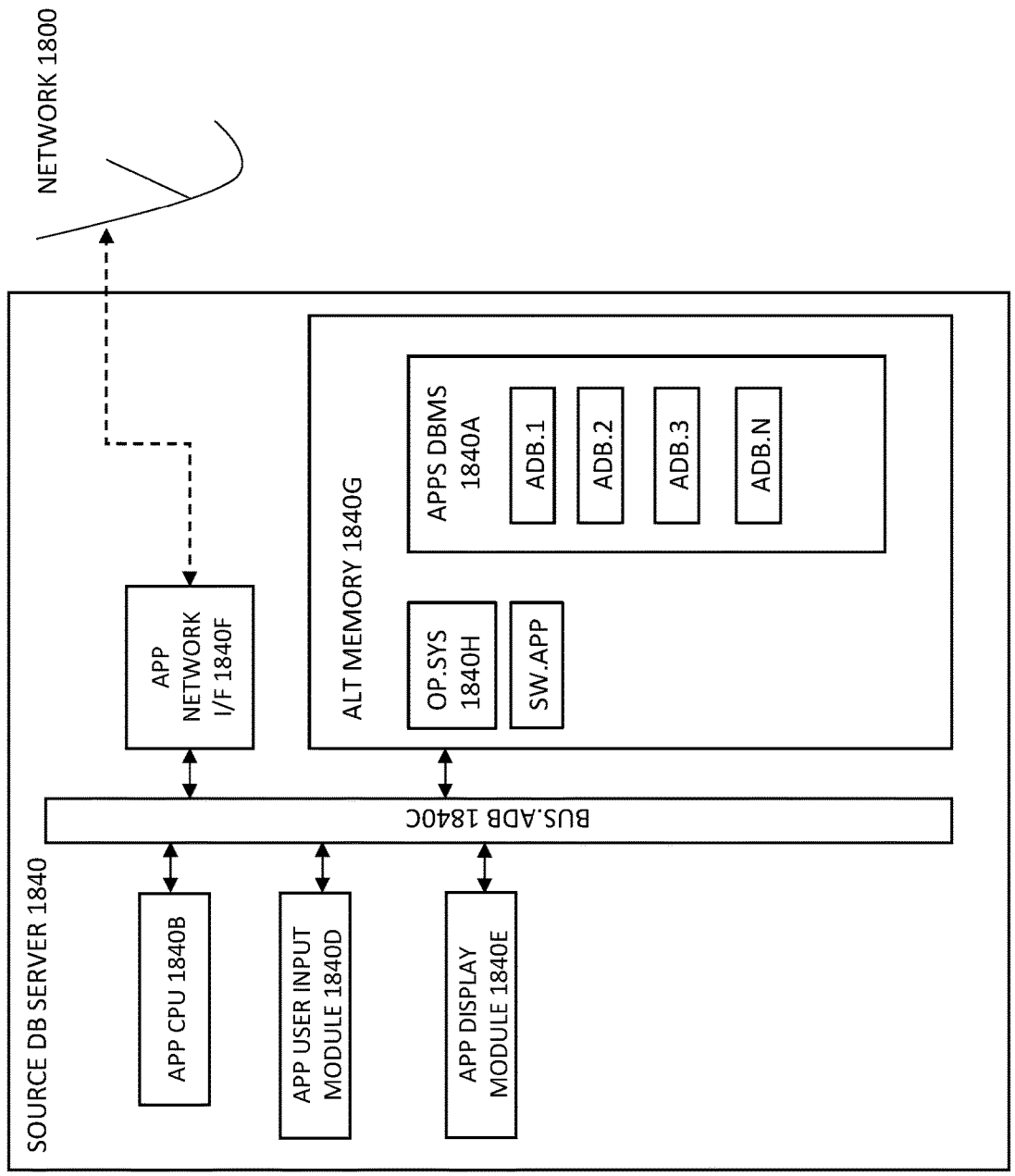

FIG. 20 is a block diagram of the source database server of FIG. 18.

Figure 21:
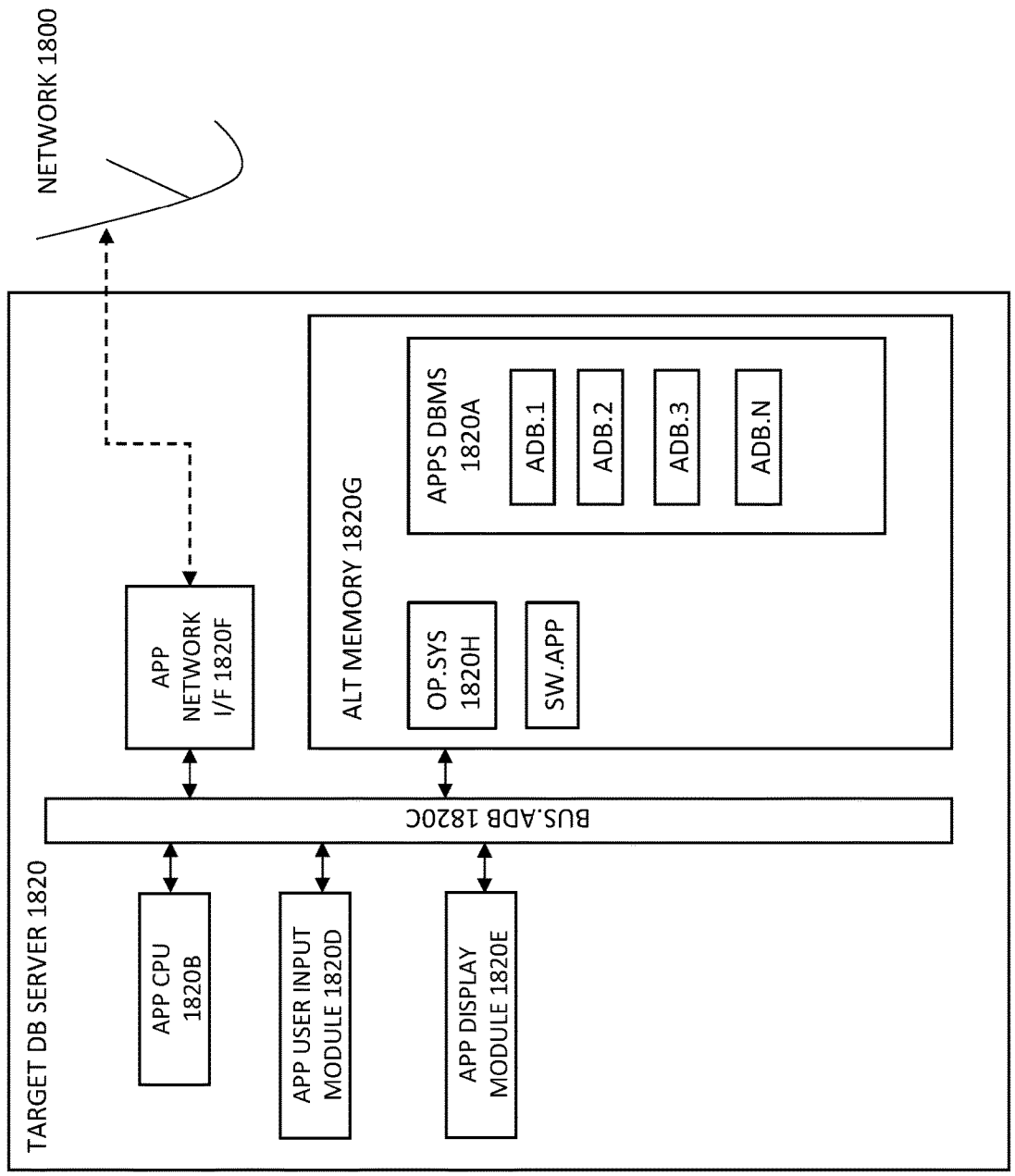

FIG. 21 is a block diagram of the target database server of FIG. 18.

Figure 22:
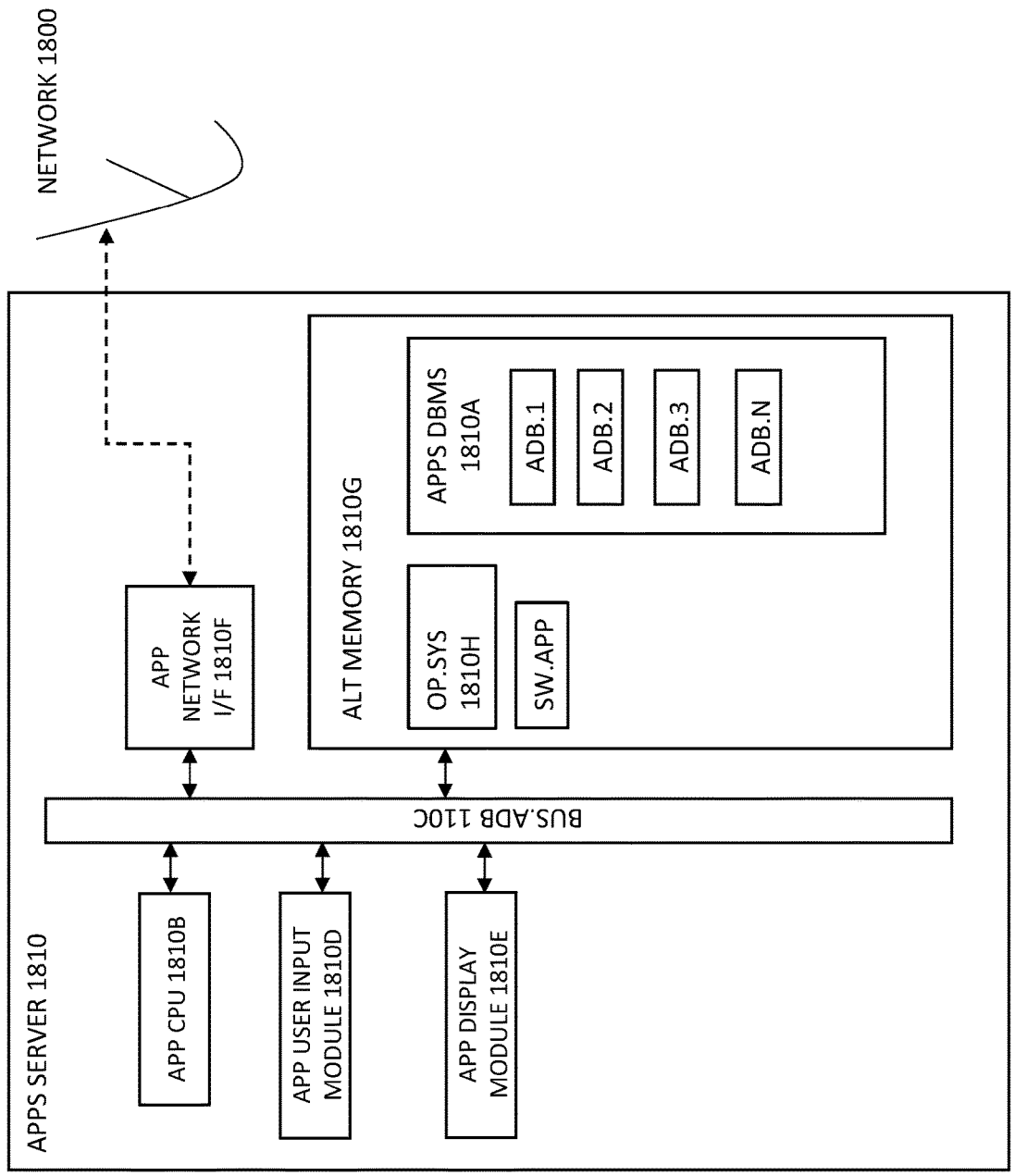

FIG. 22 is a block diagram of the application server of FIG. 18.

Figure 23:
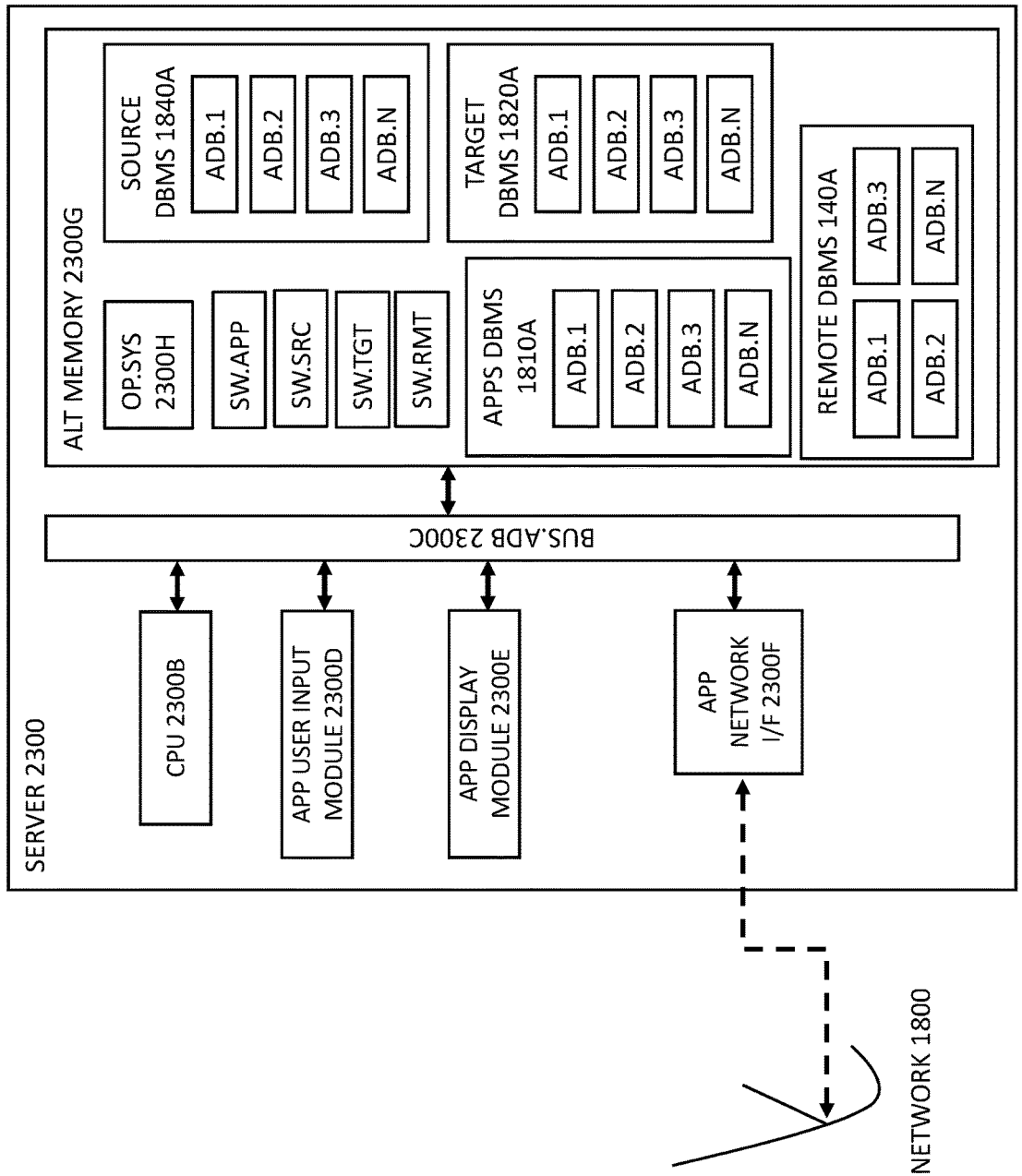

FIG. 23 is a block diagram of a computing system hosting the target server, source server, app server, and remote server.

The Figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE INVENTION

Referring now generally to the Figures, and particularly to FIG. 1, FIG. 1 is a diagram of an electronic communications network 100 comprising an application server 110, a local database server 120, an alternate application database server 130 and a remote database server 140. The applications server 110, the local database server 120, the alternate application database server 130 (hereinafter, "the apps DB server" 130), and the remote database server 140 each preferably comprise a separate database management system software, respectively an application server DBMS 110A, a local DBMS 120A, an apps DBMS 130A, and a remote DBMS 140A.

The application server DBMS 110A, the local DBMS 120A, the apps DBMS 130A and/or the remote DBMS 140A may be or comprise an object-oriented database management system ("OODBMS") and/or a relational database management system ("RDBMS"), and one or more databases DBS.1-DBS.N may be or comprise an object-oriented database and/or a relational database. More particularly, the application server DBMS 110A the local DBMS 120A, the apps DBMS 130A, or the remote DBMS 140A may be or comprise one or more prior art database management systems including, but not limited to, an ORACLE DATABASE™ database management system marketed by Oracle Corporation, of Redwood City, Calif.; an SNOWFLAKE™ database management system marketed by Snowflake Computing, Inc. of San Mateo, Calif.; a DB2™ relational database management system as marketed by IBM Corporation of Armonk, N.Y.; a Microsoft SQL Server™ relational database management system as marketed by Microsoft Corporation of Redmond, Wash.; MySQL™ as marketed by Oracle Corporation of Redwood City, Calif; and a MONGODB™ as marketed by MongoDB, Inc. of New York City, USA; and the POSTGRESQL™ open source object-relational database management system.

The remote database server 140 may bi-directionally communicate and transfer data with the applications server 110 via the network 100 by suitable electronic communications messaging protocols and methods known in the art including, but not limited to, Simple Object Access Protocol, Representational State Transfer, and/or a webservice adapted to conform with the architecture and structure of the World Wide Web. The applications server 110 may bi-directionally communicate and transfer data with the local database server 120 by suitable electronics communications messaging protocols and methods known in the art including, but not limited to, communications conforming to Structured Query Language, Not Only Structured Query Language ("NoSQL"), flat file transfer, and/or bulk loading of information, data and records.

It is understood that the application server 110, the local database server 120, the apps DB server 130, and the remote database server 140 may be a software program hosted and/or enabled by, or may be or comprise a bundled computer software and hardware product such as, a.) a Z8 G4 computer workstation marketed by Hewlett Packard Enterprise of San Jose, Calif. and running a Red Hat Linux™ operating system marketed by Red Hat, Inc. of Raleigh, N.C.; (b.) a Dell Precision™ computer workstation marketed by Dell Corporation of Round Rock, Tex., and running a Windows™ 10 operating system marketed by Microsoft Corporation of Redmond, Wash.; (d.) a Mac Pro workstation running MacOS X™ as marketed by Apple, Inc. of Cupertino, Calif.; or (e.) other suitable computational system or electronic communications device known in the art capable of providing or enabling a web service known in the art.

It is understood that the apps DB server 130 combines the functionality of the applications server 110 and the local database server 120 of the processes of FIG. 2 and FIG. 4 through FIG. 6.

Figure 2:
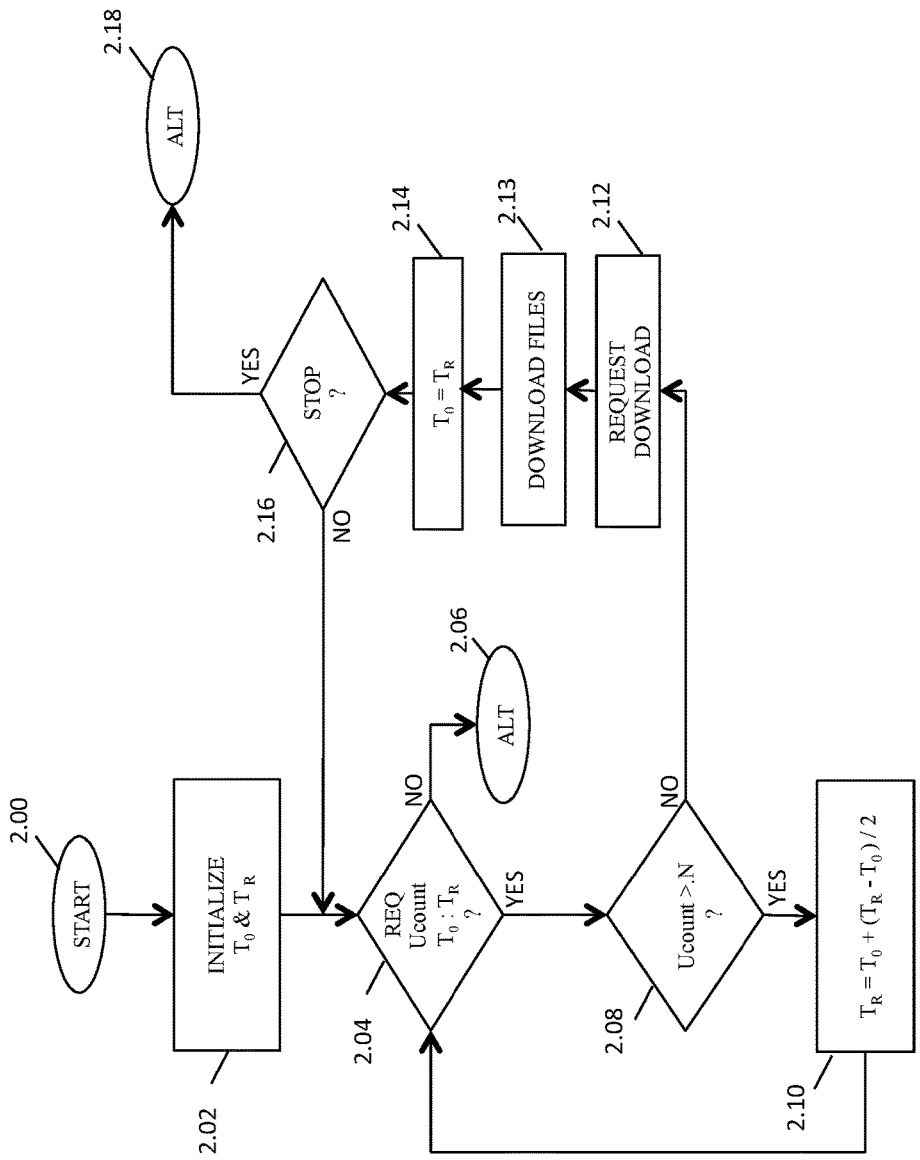
FIG. 2 is a flowchart of certain optional aspects of the invented method relating to the functioning of the application server of FIG. 1 wherein updates are requested and downloaded.

Referring now generally to the Figures, and particularly to FIG. 2, FIG. 2 is a flowchart of a method of the current invention describing the process by which the application server 110 requests and downloads updates from the remote database server 140. It is understood that, as presented in FIGS. 8 through 13 and applied in the methods of FIGS. 2 through 7, each of a plurality of databases RDB.1-RDB.N preferably includes a unique record data REC.DATA.001-REC.DATA.N and an associated date time stamp DTS0.001-DTS.N.

In step 2.00 the process starts. In step 2.02 the application server 110 initializes and defines a T.sub.0 time start variable value ("T.sub.0") and a T.sub.R time range end variable value ("T.sub.R") wherein T.sub.0 is a date-time value representing the beginning of a specified time segment and is preferably equivalent to the most recent value date-time stamp DTS.001-DTS.N of the record data REC.DATA.001-REC.DATA.N downloaded from the remote database server 140 to the local database server 120 via the application server 110.

The T.sub.R is a date time value representing the end of the specified time segment, and may be a date time value approximately representing a current execution time of a step or aspect of the invented method. In step 2.04, the application server 110 determines whether to request a number of data records REC.001-REC.N ("Ucount") with the date-time stamps DTS.001-DTS.N having values falling within the specified time segment defined by T.sub.0 and T.sub.R from the remote database server 140. If the application server 110 determines not to request the Ucount, it proceeds to step 2.06, wherein it proceeds to perform alternate processes. Alternatively, the application server 110 requests a new Ucount from the remote database server 140, i.e. wherein the Ucount is derived as a count of the number of data records REC.001-REC.N having associated datetime stamp values DTS.001-DTS.N within the time segment defined by T.sub.0 and T.sub.R.

In step 2.08, the application server 110 receives a Ucount from the remote database server 140 and determines whether the received Ucount is greater than a specified update capacity number N. If the determination made by the application server 110 in step 2.08 is that the most recently received Ucount is greater than the specified update capacity number N, the application server 110 advances to step 2.10, wherein it resets the current date time value of T.sub.R as equal to a date time value closer in time to the current T.sub.0.

In step 2.10 the T.sub.R is reset to be equal in value to the summation of (a.) the current T.sub.0 and (b.) the delta of the current TR and the current T.sub.0 divided by a specified divisor, for example, but not limited to 2. In other words, T.sub.R is reset by first subtracting the current T.sub.0 from the current T.sub.R, then dividing the resultant delta time value by a specified divisor, and then adding the resultant value to the current T.sub.0. The specified divisor applied in a reset calculation of T.sub.R of step 2.10 may be, in various alternate preferred embodiments of the present invention, equal to the whole number two, less than the whole number two, or greater than the whole number two.

The application server 110 subsequently returns to step 2.04 and requests the update count between the initial T.sub.0 and the most recently reset T.sub.R. The application server 110 repeats the loop of steps 2.04-2.10 until a determination is made in an execution of step 2.08 that the Ucount most recently received from the remote database server 140 is not greater than the specified update capacity number N. The application server 110 subsequently proceeds on to step 2.12 and requests and receives downloads of all data records REC.001-REC.N from the remote database server 140 that each separately comprising a date time stamp DTS.001-DTS.N having a value within the range of the current T.sub.0 and the most recently reset T.sub.R.

The remote database server 140 may transfer one or more data records REC.001-REC.N to the applications server 110 in step 2.12 via the network 100 by suitable electronic communications messaging protocols and methods known in the art including, but not limited to, Simple Object Access Protocol, Representational State Transfer, and/or a web service adapted to conform with the architecture and structure of the World Wide Web. The applications server 110 transfers all data records REC.001-REC.N received in step 2.12 to the local database server 120 in step 2.13 by suitable electronics communications messaging protocols and methods known in the art including, but not limited to, communications conforming to Structured Query Language, Not Only Structured Query Language ("NoSQL"), flat file transfer, and/or bulk loading of information, data and records.

In step 2.14 the application server 110 resets T.sub.0 to be equal to the most recent T.sub.R. In step 2.16, the application server 110 determines whether to terminate the process. If the determination to terminate the process is positive, the application server advances to step 2.18, wherein it proceeds to alternate processes. If the determination in step 2.16 is negative, the application server 110 returns to step 2.04, and repeats the loop of steps 2.04-2.16 as necessary.

Figure 3:
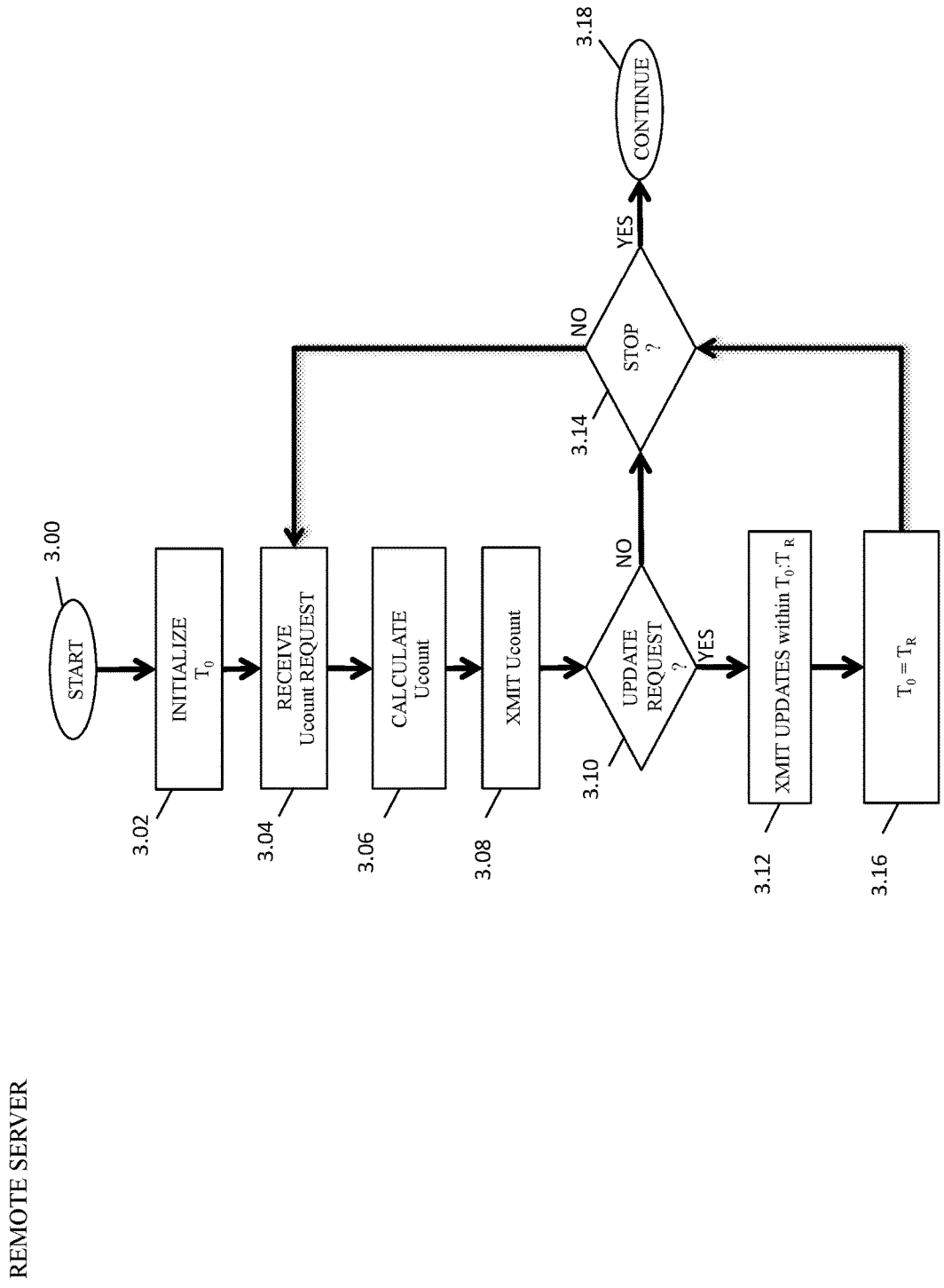
FIG. 3 a flowchart of further aspects of the invented method relating to the functioning of the remote database server of FIG. 1 wherein updates are counted and transmitted.

Referring now generally to the Figures, and particularly to FIG. 3, FIG. 3 is a flowchart of further aspects of the invented method by which the remote database server 140 transmits updates to the application server 110. In step 3.00, the process starts. In optional step 3.02 the remote database server 140 optionally initializes and defines a T.sub.0 wherein T.sub.0 is a time-date stamp representing the beginning of a specified time segment, generally representing the most recent value of a date time stamp DTS.001-DTS.N of all records REC.001-REC.N previously downloaded from the remote database server 140 to the application server 110.

In step 3.04 the remote database server 140 receives a Ucount request containing the T.sub.0 and a current T.sub.R. In step 3.06 the remote database server 140 calculates the Ucount to be transmitted to the application server 110, wherein the Ucount is calculated as the total amount of record information REC.DATA.001-REC.DATA.N of database records REC.001-REC.N that are associated with or comprise date time stamps DTS.001-DTS.N having values that fall between the T.sub.0 and the T.sub.R received in step 3.04.

In step 3.08 the remote server database 140 transmits the Ucount to the application server 110. The remote database server 140 in step 3.10 determines whether it has received an update request. If the determination in step 3.10 is positive, the remote database server 140 proceeds to step 3.14 wherein it downloads to the application server 110 the record information REC.DATA.001-REC.DATA.N of database records REC.001-REC.N that are associated with date time stamps DTS.001-DTS.N having values within the specified time frame T.sub.0-T.sub.R of the Ucount request received in step 3.04. In optional step 3.16 the remote database server 140 resets the value of T.sub.0 to the value of T.sub.R received in step 3.04.

When the optional step 3.16 is completed, or if the determination in step 3.10 is negative, the remote database server 140 proceeds to step 3.12, and determines whether to terminate the process of the loop of steps 3.04 through 3.14. If the remote database server 140 determines in step 3.16 to terminate the process of the loop of steps 3.04 through 3.14, it continues to alternate processes in step 3.18. If the determination to terminate in step 3.12 of the process of the loop of steps 3.04 through 3.14 is negative, the remote database server 140 proceeds back to step 3.04, wherein the remote database server 140 waits to receive a new Ucount request message, and continues the loop of steps 3.04-3.12 until the determination is made in step 3.14 to terminate the process of the loop of steps 3.04 through 3.14.

Figure 4:
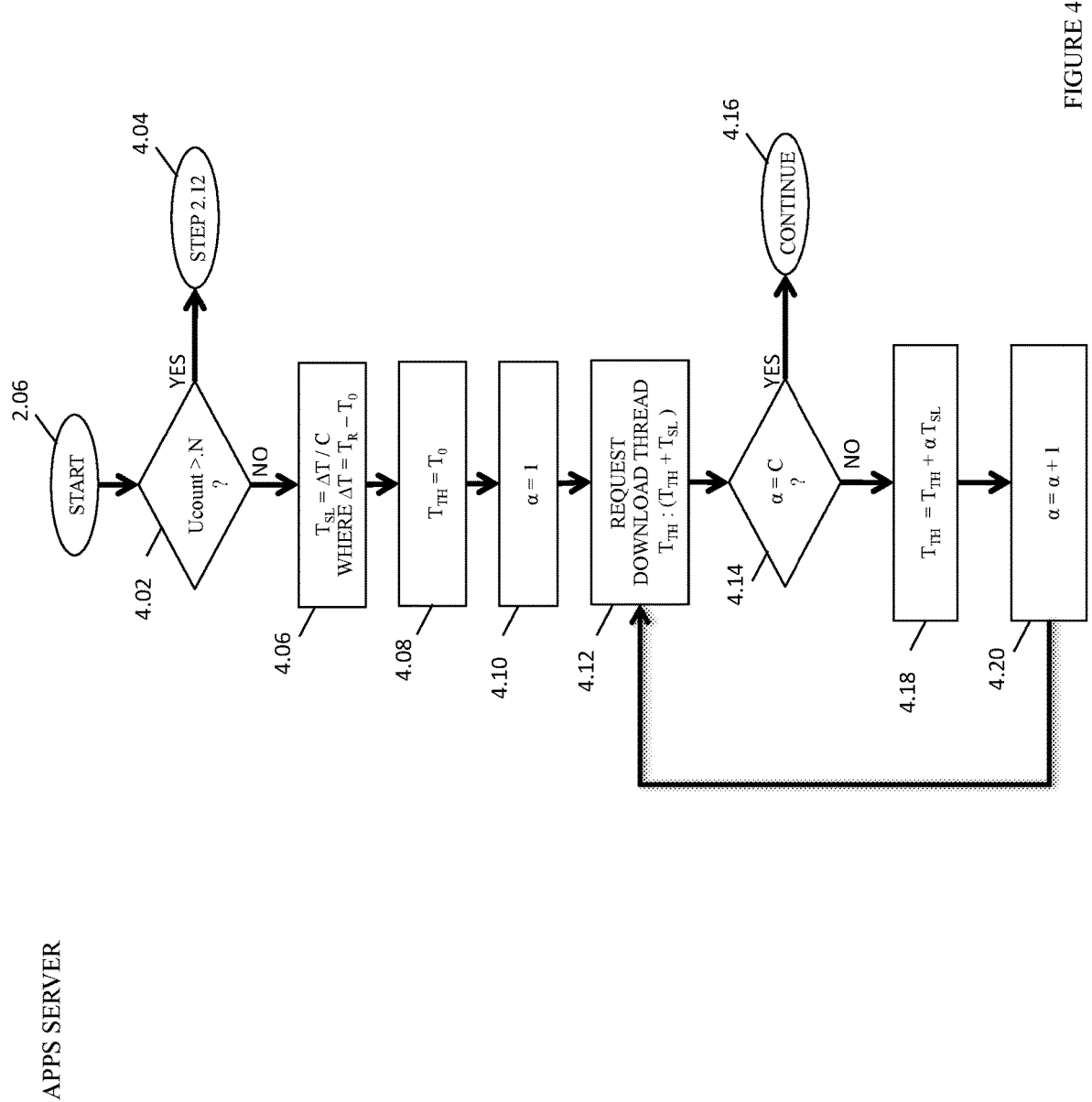
FIG. 4 is a flowchart of yet further aspects of the invented method relating to the application server of FIG. 1, describing the process by which updates are requested, divided between threads, and downloaded.

Referring now generally to the Figures, and particularly to FIG. 4, FIG. 4 is a flowchart of a yet further optional aspects of the invented method wherein record information REC.DATA.001-REC.DATA.N are optionally downloaded through one of a plurality of download threads for the purpose of expediting their download from the remote database server 140 via the applications server 110 to the local database server 120.

The flowchart of FIG. 4 begins at step 2.06 in FIG.2, which is labeled ALT in FIG. 2 and START in FIG. 4. In step 4.02 the application server 110 determines whether the Ucount received from the remote database server 140 is greater than the specified update capacity number N. If the determination in step 4.02 is positive, the application server 110 repeats step 2.12 of FIG. 2 as indicated in step 4.04. Else if the determination in step 4.02 is negative, in step 4.06 the application server initiates and defines a time slice T.sub.SL which is equal to a DELTA.T divided by C, where C is a constant representing a specified number of authorized threads, and where .DELTA.T is the difference between the current $T_0$ representing the beginning of a specified time segment, and the current $T_R$, representing the end of a specified time segment, In step 4.08 the application server 110 creates a date time variable value $T_{TH}$ and sets it as a new beginning time-date stamp $T_0$, where $T_{TH}$ represents a per-thread time segment. The application server 110 in step 4.10 sets a thread counter a to one. In step 4.12 the application server 110 initiates and receives a download thread that transfers data records REC.001-REC.N having date time stamps DTS.001-DTS.N within the time segment between $T_{TH}$ and the sum of $T_{TH}$ and $T_{SL}$, and in step 4.13 transfers data records REC.001-REC.N received from the remote database server 140 to the local database server 120. The applications server 110 may bi-directionally communicate and transfer data to and from the local database server 120 in step 4.13 by suitable electronics communications messaging protocols and methods known in the art including, but not limited to, communications conforming to Structured Query Language, Not Only Structured Query Language ("NoSQL"), flat file transfer, and/or bulk loading of information, data and records.

In step 4.14 the application server 110 determines whether the thread counter a is equal to the number of threads C. If the determination in step 4.14 is positive, the application server 110 proceeds to step 4.16 wherein it continues to alternate processes. If the application server 110 determines in step 4.14 that the thread counter a is not equal to the number of threads C, in step 4.18 the application server 110 creates a new per-thread time segment $T_{TH}$, consisting of the sum of the initial $T_{TH}$ plus the product of the value of the thread counter a and the time slice $T_{SL}$. In step 4.20 the thread counter a is incremented by the application server 110 to be equal to a plus one. The application server 110 then proceeds back to step 4.12 and repeats steps 4.12-4.20 until all updates contained within Ucount are assigned to a specified thread.

Figure 5:
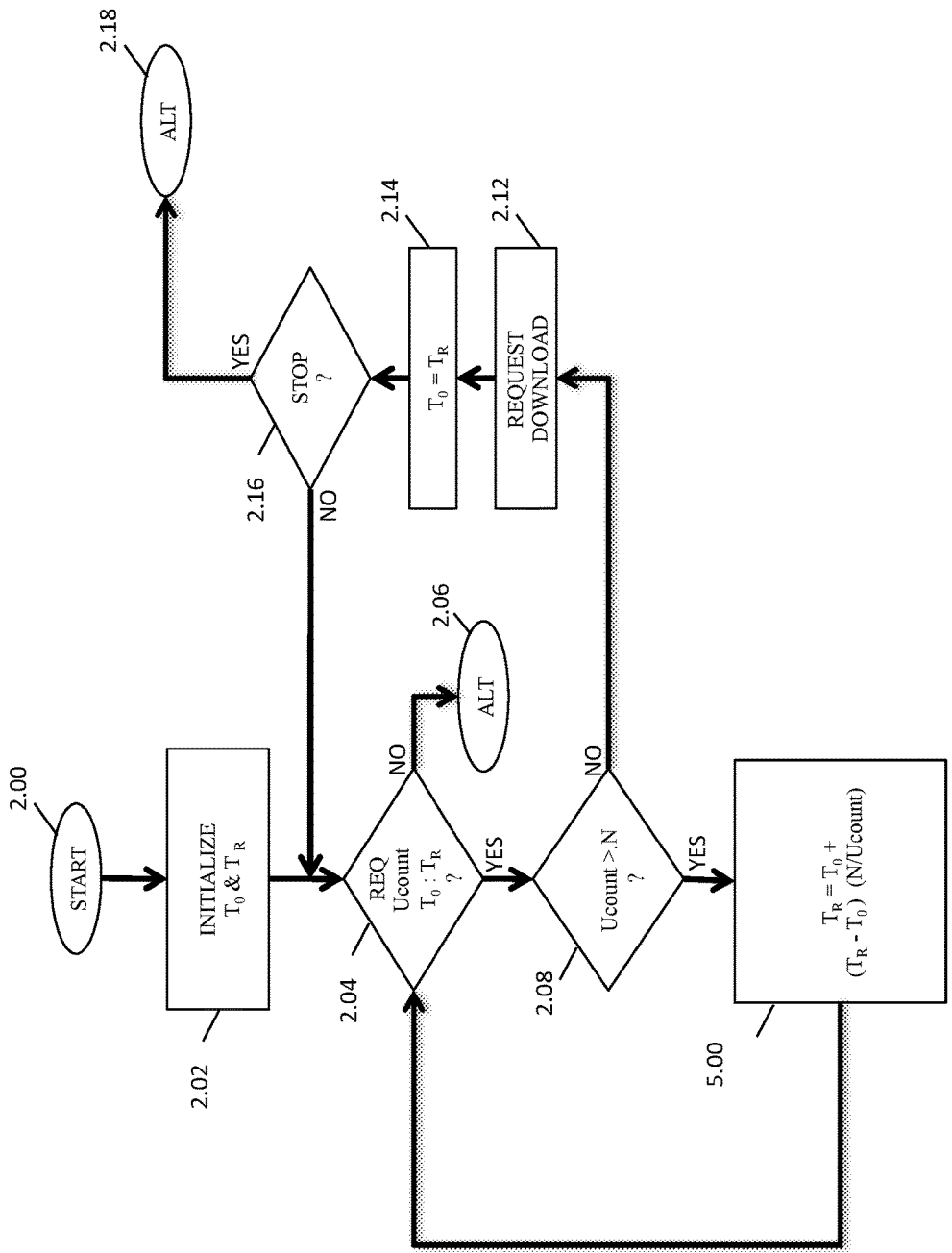
FIG. 5 is a flowchart performed by the application server of FIG. 1 comprising yet alternate optional aspects of the invented method, wherein a requested time range of record updates is developed in accordance with a ratio developed in view of an earlier number of record updates counted and reported preferably within an earlier requested and larger time range.

Referring now generally to the Figures, and particularly to FIG. 5, FIG. 5 is a flowchart performed by the application server 110 comprising yet alternate optional aspects of the invented method, wherein update counts Ucount may be developed and requested in accordance with a ratio developed in view of an earlier Ucount value of record information REC.DATA.001-REC.DATA.N associated with date time stamps DTS.001-DTS.N having values falling within a larger and earlier requested time range $T_0$ to $T_R$. In the method of FIG. 5, the application server 110 performs the steps 2.00 through 2.08 and 2.12 through 2.18 of the method of FIG. 2, and the algorithm of step 2.10 of FIG. 2 is replaced with the ratio based algorithm of step 5.00 that generated a new range of $T_0$ through $T_R$ by the formula of resting $T_R$ to a new value equal to the current $T_0$ plus the resultant value of $(T_R-T_0)$ multiplied by $(N/Ucount)$, as presented in the flowchart of FIG. 5.

Figure 6:
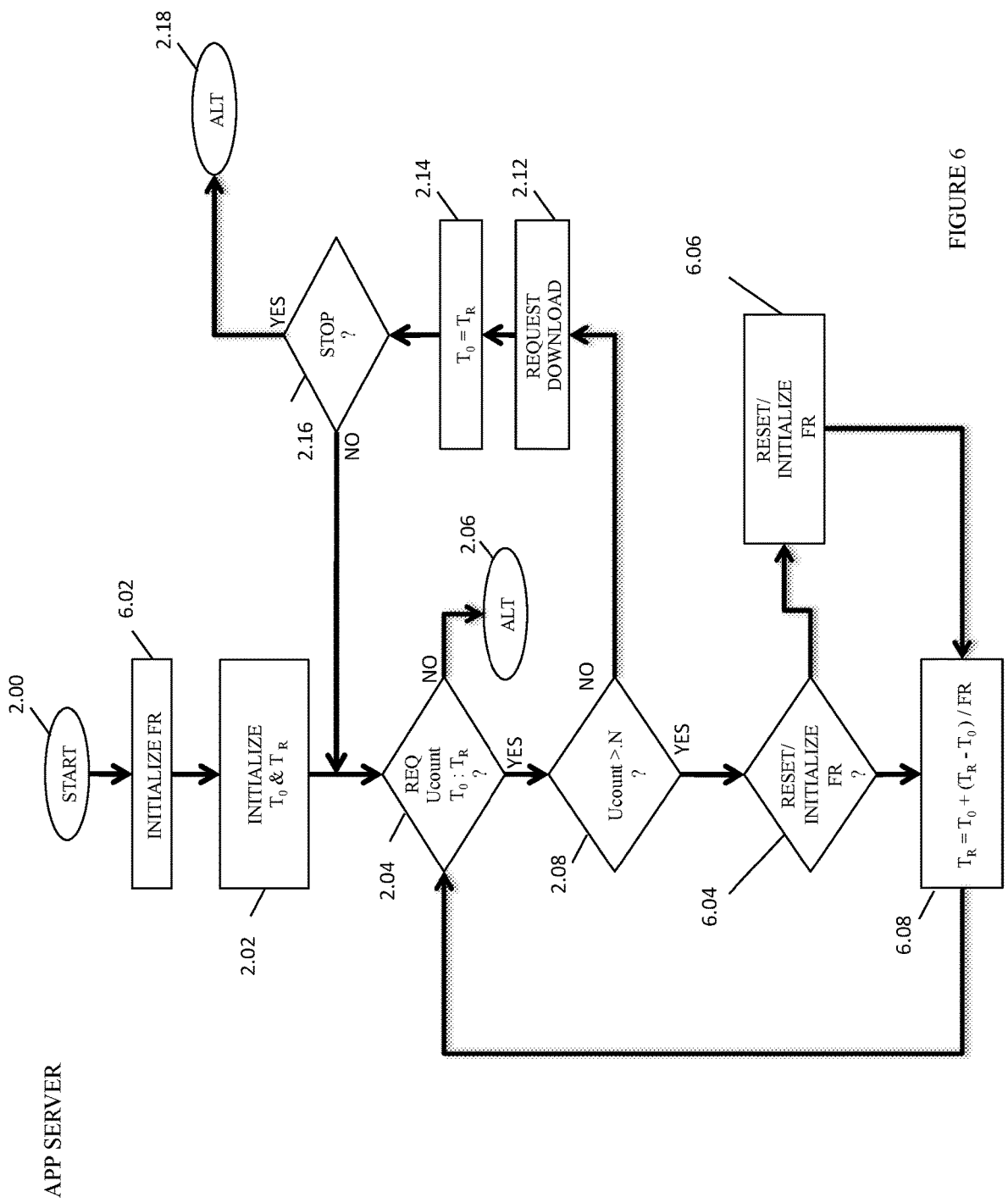
FIG. 6 is a flowchart performed by the application server of FIG. 1 comprising additional alternate optional aspects of the invented method, wherein a requested time range of record updates is calculated by application of a denominator factor FR by which an earlier applied time range is divided by the denominator factor FR to generate a shorter time range that resides preferably within the bounds of the earlier applied time range.

FIG. 6 is a flowchart performed by the application server 110 comprising still alternate optional aspects of the invented method, wherein a requested time range of record updates is developed by application of a denominator factor FR by which an earlier applied time range is divided by the denominator factor FR to generate a shorter time range that resides within the bounds of the earlier applied time range.

In step 6.02 the denominator factor FR is initialized by the application server 110, wherein the denominator factor FR may be received as a user input or from the local database server 120. In optional step 6.04 the application server 110 determines whether the denominator factor FR shall be reset, wherein the reset of the denominator factor FR to a new value of step 6.06 may optionally be directed by user input. In step 6.08 the value of the variable $T_R$ is reset by application of the formula of adding the current $T_0$ to the resultant value of a division of the delta between the current $T_0$ and the current $T_R$ by the denominator factor FR. It is understood that the denominator factor FR may be a variable that may be in various instances of the invented method (a.) greater in numeric value than the whole number two, (b.) equal to the whole number two, or (c.) lesser in numeric value than the whole number two.

Figure 7:
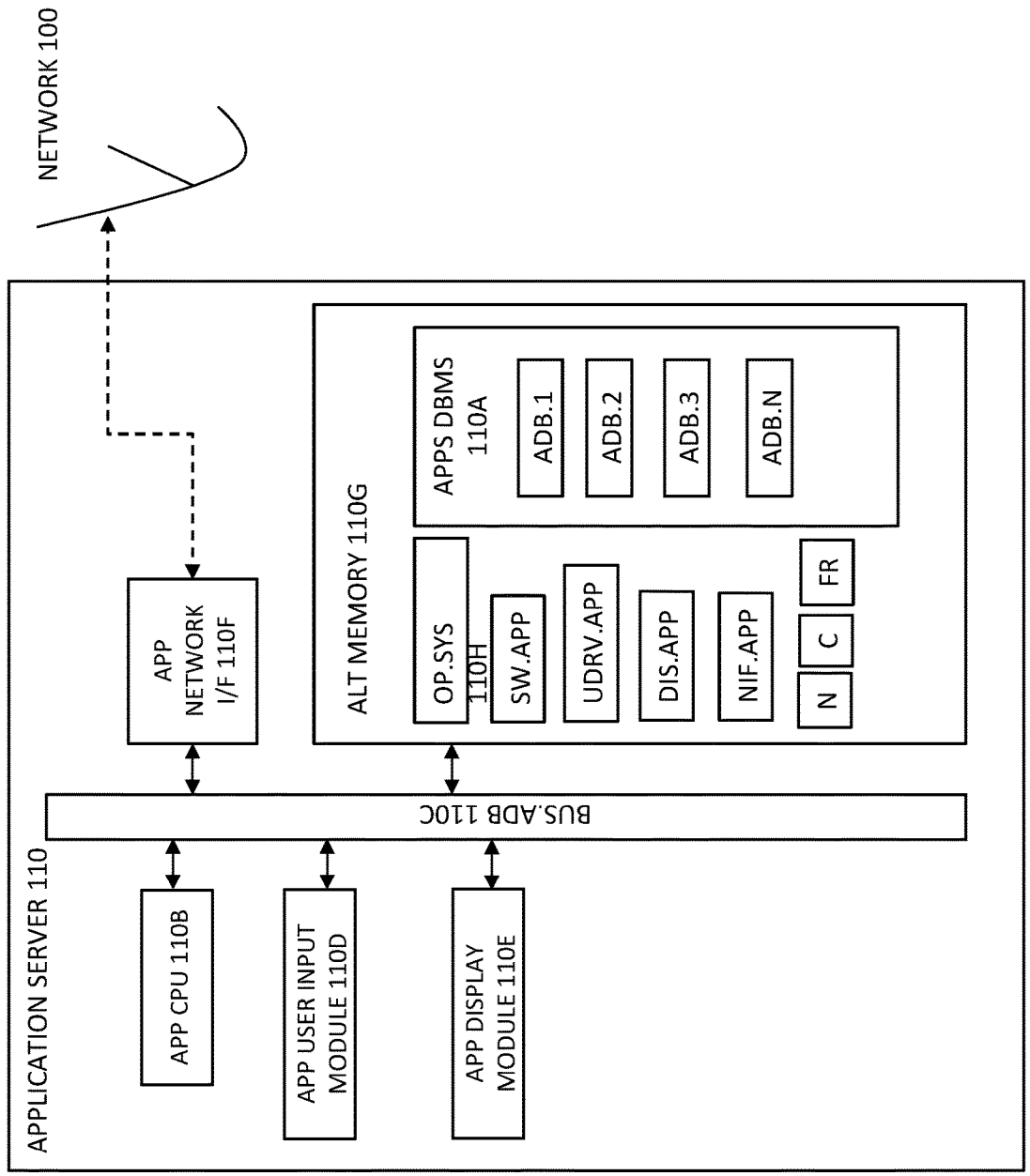
FIG. 7 is a block diagram of the application server of FIG. 1.

Referring now generally to the Figures and particularly to FIG. 7, FIG. 7 is a block diagram of the application server of FIG. 1.

An application system server operating system software OP. SYS 110H of the application server 110 may be selected from freely available, open source and/or commercially available operating system software, to include but not limited to Red Hat Linux™ marketed by Red Hat, Inc. of Raleigh, N.C. or derivative operating system, such as CentOS Linux open source operating system software; the Windows 10™ operating system as marketed by Microsoft Corporation of Redmond, Wash.; or the MacOS X™ operating system or iPhone iOS™ as marketed by Apple, Inc. of Cupertino, Calif.

The application server 110 further includes an application central processing unit 110B ("CPU 110B") that is bi-directionally communicatively coupled by an apps internal communications bus 110C with (a.) an optional apps user input module 110D that accepts input, e.g., information and commands, from a user, (b.) an optional apps video display module 110E that provides visual information rendering output, (c.) an apps network interface 110F that bi-directionally communicatively couples the application server 110 with the local database server 120 and remote database server 140, and (d.) an apps system memory 110G.

Figure 8:
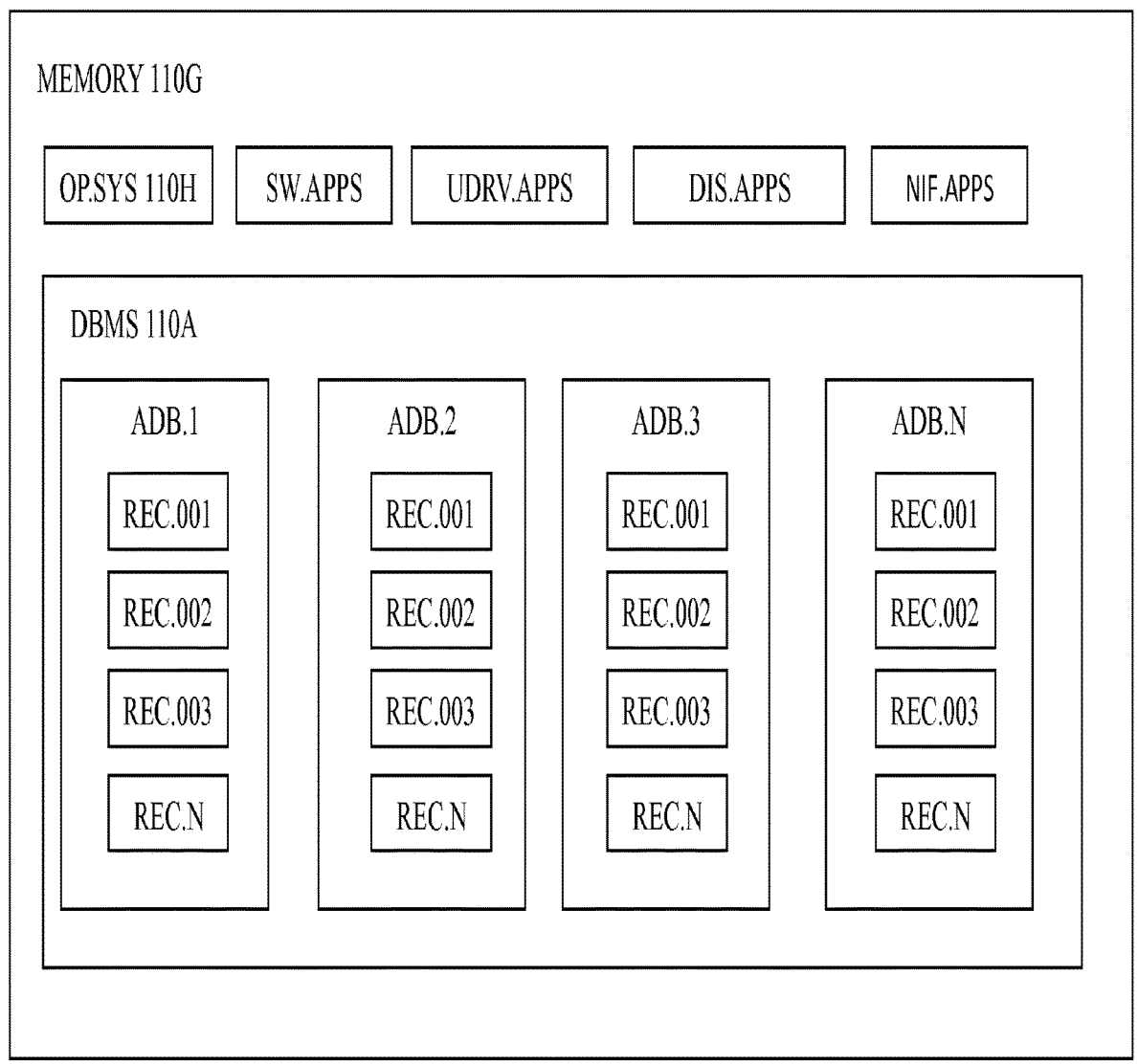
FIG. 8 is a block diagram of software stored within the application server of FIG. 1.

Referring now generally to the Figures and particularly to FIG. 8, FIG. 8 is a block diagram of software stored within the apps system memory 110G of the application server 110. Stored within the apps system memory 110G, is the apps operating system 110H, an apps server software SW.APPS, an apps user module driver UDRV.APPS, an optional apps display driver DIS.APPS, an apps network interface driver NIF.APPS enables the apps network interface 110F to bi-directionally communicatively couple the application server 110 with local database server 120 and the remote database server 140.

The app server software SW.APPS enables the application server 110 to execute, perform and instantiate aspects of the invented method as disclosed within FIGS. 2 through 6 and accompanying descriptions. The apps user input module driver UDRV.APPS enables the apps user module 110D to input information and commands entered by a user into the application server 110. The apps display driver DIS.APPS enables the application server 110 to visually render information by means of the apps video display module 110E. The apps network NIF.APPS enables the apps network interface module 110F to bi-directionally communicate with local database server 120 and the remote database server 140.

Within the apps DBMS 110A, there are multiple application databases ADB.1-ADB.N, each having database records REC.001, REC.002, REC.003 and REC.N. These records REC.001-REC.N may be shared with other servers 120 & 140 in the network 100.

Figure 9:
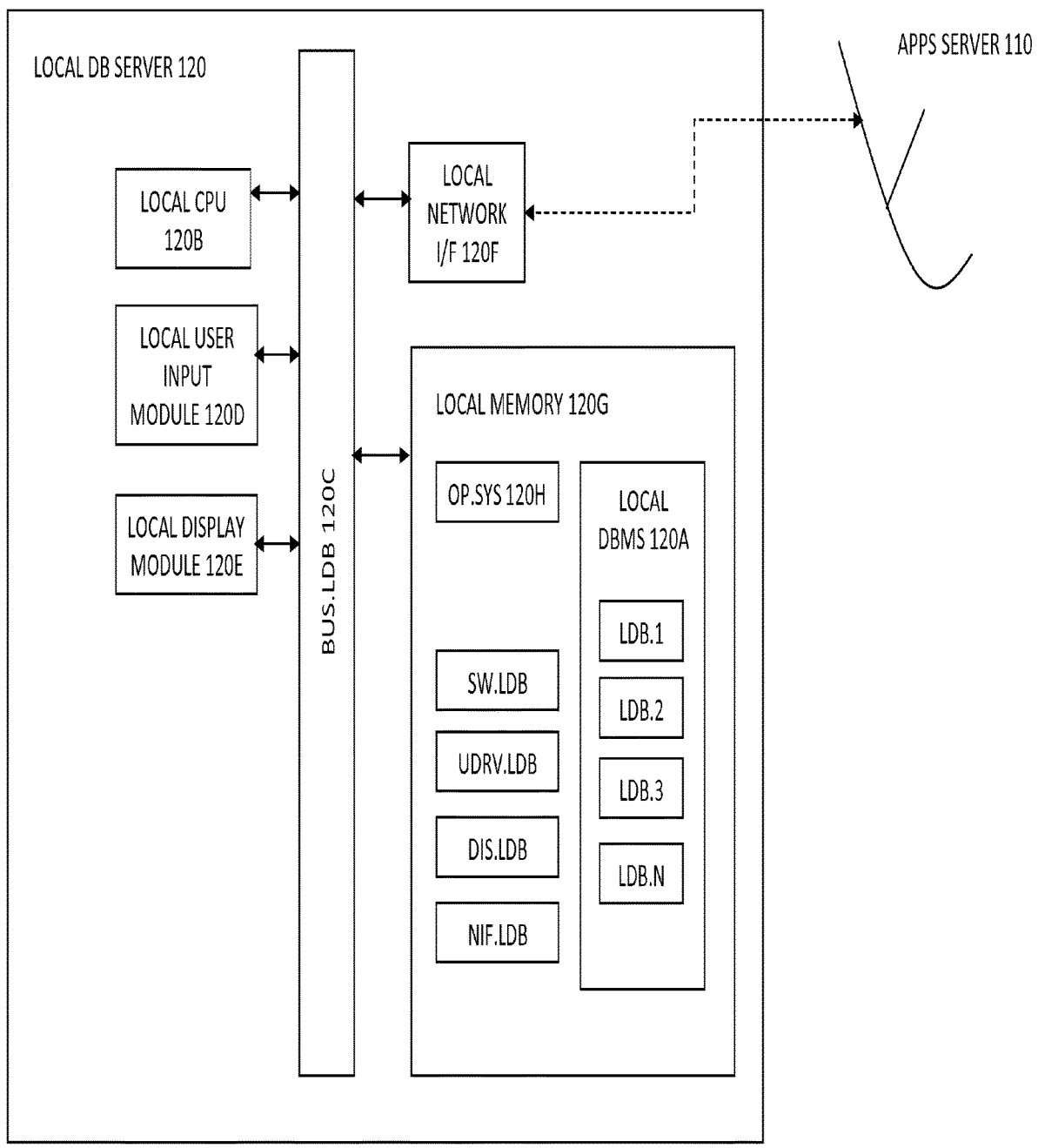
FIG. 9 is a block diagram of the local database server of FIG. 1.

Referring now generally to the Figures and particularly to FIG. 9, FIG. 9 is a block diagram of the local database server 120.

A local database server operating system software OP.SYS 120H of the local database server 120 may be selected from freely available, open source and/or commercially available operating system software, to include but not limited to Red Hat Linux™ marketed by Red Hat, Inc. of Raleigh, N.C. or derivative operating system, such as CentOS Linux open source operating system software; a Windows 10™ operating system as marketed by Microsoft Corporation of Redmond, Wash.; or the MacOS X™ operating system or iPhone iOS™ as marketed by Apple, Inc. of Cupertino, Calif.

The local database server 120 includes a local central processing unit 120B ("CPU 120B") that is bi-directionally communicatively coupled by a local internal communications bus 120C with (a.) a local user input module 120D that accepts input from a user, (b.) a local video display module 120E that visually renders information, (c.) a local network interface 120F that bi-directionally communicatively couples the local database server 120 with the application server 110 and optionally with the remote database server 140, and (a.) a local server system memory 120G.

Figure 10:
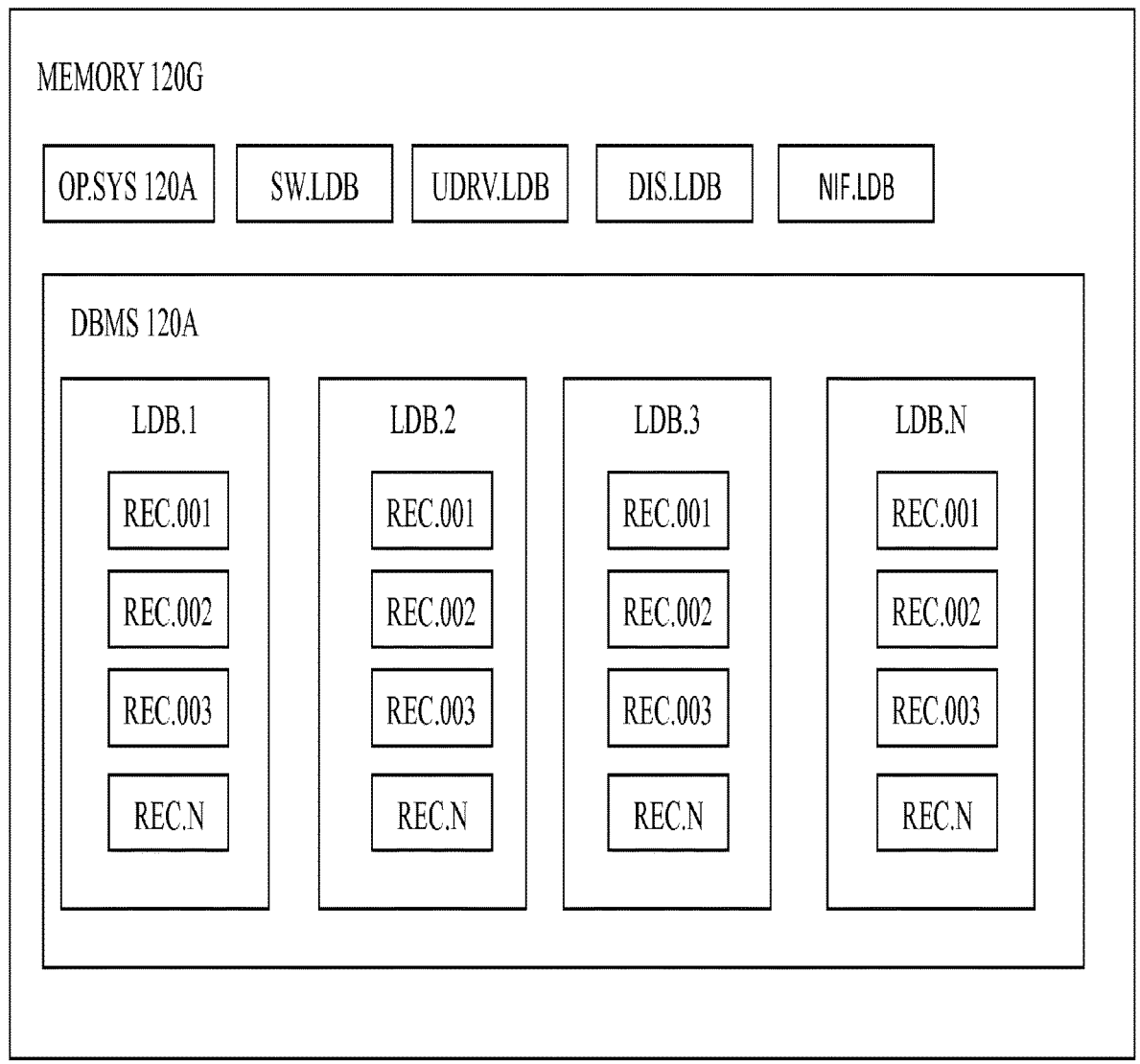
FIG. 10 is a block diagram of software stored within the local database server of FIG. 1.

Referring now generally to the Figures and particularly to FIG. 10, FIG. 10 is a block diagram of software stored within the local server system memory 120G of the local database server 120. Stored within the local server system memory 120G, is the local database server operating system software OP.SYS 120H, a local server software SW.LDB, an optional local user module driver UDRV.LDB, an optional local display driver DIS.LDB, and a local network interface driver NIF.LDB that enables the local network interface 120F to bi-directionally communicatively couple the local database server 120 with the application server 110.

The local server software SW.LDB enables the local database server 120 to execute, perform and instantiate aspects of the invented method as disclosed within FIGS. 2 through 6 and accompanying descriptions. The optional local user input module driver UDRV.LDB enables the optional local user module 120D to input information and commands entered by a user into the local database server 120. The local display driver DIS.LDB enables the local database server 120 to visually render information by means of the local video display module 120E. The local network interface driver NIF.LDB enables the local network interface module 120F to bi-directionally communicatively couple the local database server 120 and application server 110 and optionally the remote database server 140.

Within the local DBMS 110A, there are multiple local databases LDB.1-LDB.N, each having database records REC.001, REC.002, REC.003 and REC.N. These records REC.001-REC.N may be shared with the application server 110 and the remote database server 140. A first local database LDB.1 is or comprises a software representation of a table of data ("table").

Figure 11:
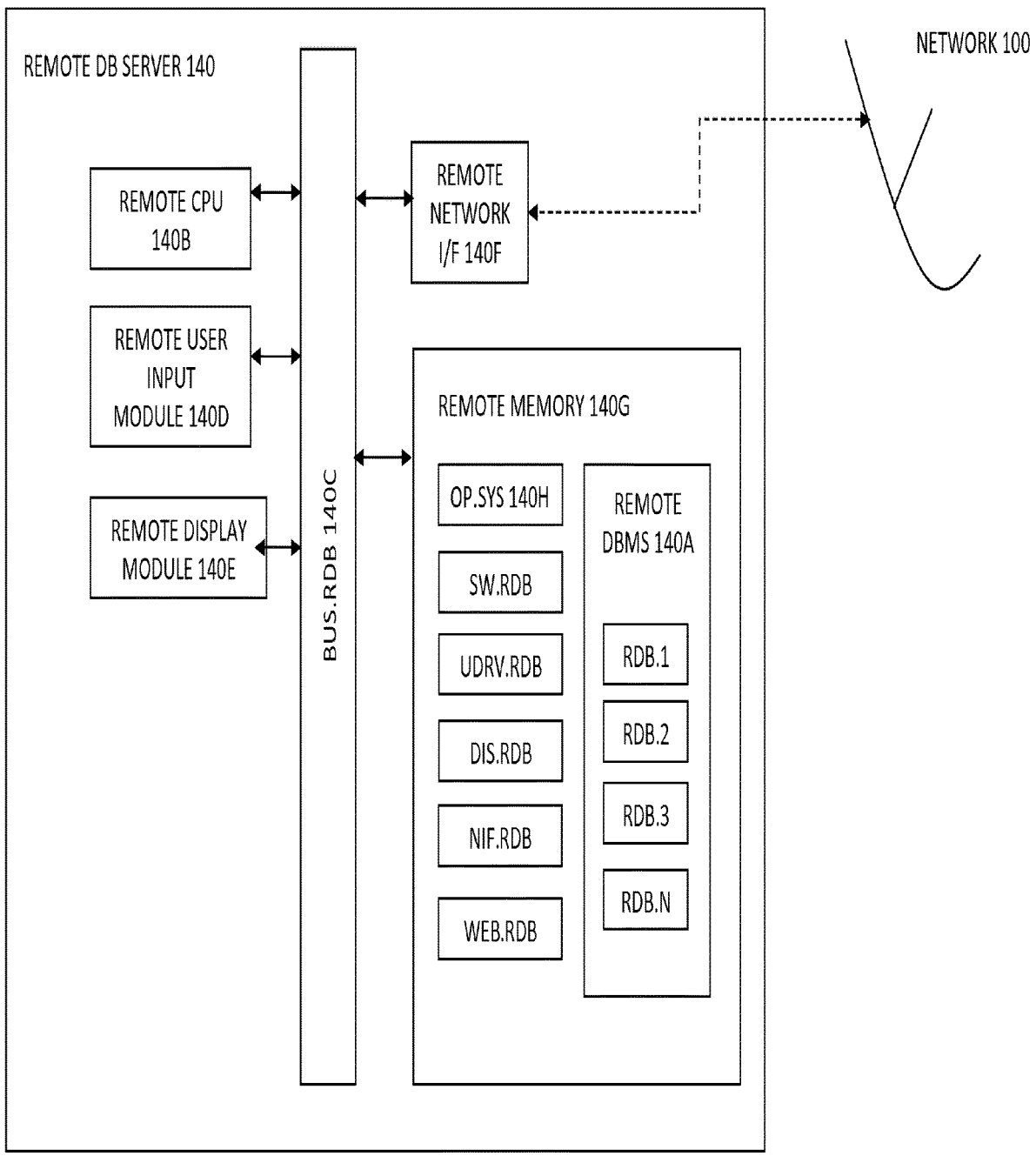
FIG. 11 is a block diagram of the remote database server of FIG. 1.

Referring now generally to the Figures and particularly to FIG. 11, FIG. 11 is a block diagram of the remote database server 140.

A remote database system server operating system software OP.SYS 140H of the remote database server 140 may be selected from freely available, open source and/or commercially available operating system software, to include but not limited to a Red Hat Linux™ marketed by Red Hat, Inc. of Raleigh, N.C. or derivative operating system, such as CentOS Linux open source operating system software; a Windows 10™ operating system as marketed by Microsoft Corporation of Redmond, Wash.; or the MacOS X™ operating system or iPhone iOS™ as marketed by Apple, Inc. of Cupertino, Calif.

The remote database server 140 includes a remote central processing unit 140B ("CPU 140B") that is bi-directionally communicatively coupled by a remote internal communications bus 140C with (a.) an optional remote user input module 140D that accepts information and commands input by a user, (b.) a remote video display module 140E that visually renders information, (c.) a remote network interface 140F that bi-directionally communicatively couples the remote server 140 with application server 110, and (d.) a remote server system memory 140G.

Figure 12:
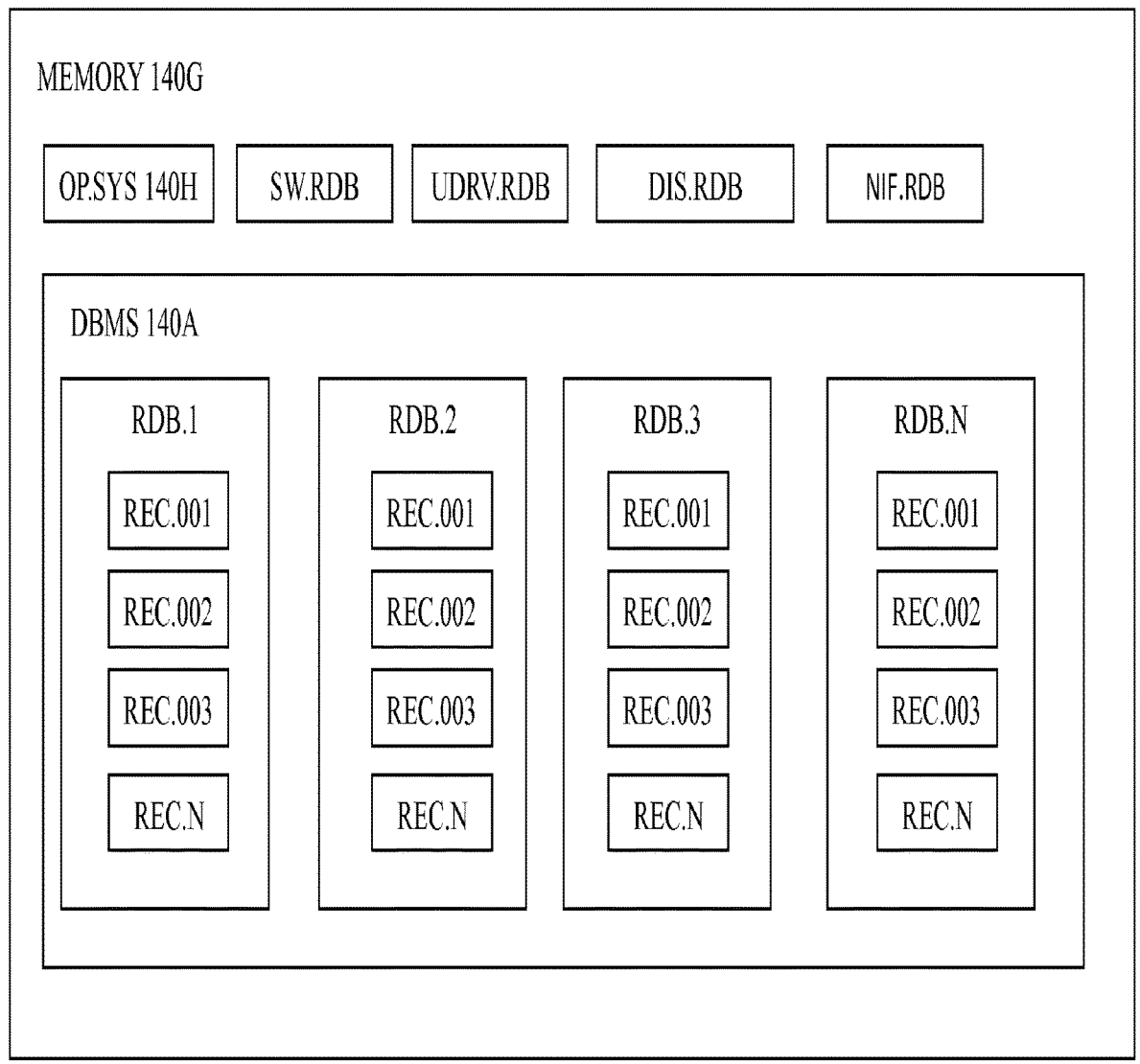
FIG. 12 is a block diagram of software stored within the remote database server of FIG. 1.

Referring now generally to the Figures and particularly to FIG. 12, FIG. 12 is a block diagram of software stored within the remote database server 140. Stored within the remote system memory 140G is the remote server operating system 140H, a remote server software SW.RDB, an optional remote user input module driver UDRV.RDB, an optional remote display driver DIS.RDB, a remote network interface driver NIF.RDB, and an optional webserver WEB.RDB.

The remote server software SW.RDB enables the remote database server 140 to execute, perform and instantiate aspects of the invented method as disclosed within FIGS. 2 through 7 and accompanying description. The remote server software SW.RDB may comprise one or more prior art of commercially available software adapted for downloading and updating a database, such as SALESFORCE™ database management software marketed by Software.com, Inc. of San Francisco, Calif.; QUICKBOOKS™ database management software marketed by Intuit, Inc. of Mountain View, Calif.; NETSUITE™ database management software of San Mateo, Calif.; and/or other suitable software known in the art.

The remote user input module driver UDRV.RDB enables the remote user input module 140D to input information and commands into the remote database server 140. The remote display driver DIS.RDM enables the remote database server 140 to visually render information by means of the remote video display module 140E. The remote network interface driver NIF.RDB enables the remote network interface module 140F to bi-directionally communicate with application server 110.

The webserver WEB.RDB enables the remote database server 140 provide and instantiate a web service in conformance with the communications protocols of the World Wide Web to communicate Ucount values to the application server and/or effect downloads of record data REC.DATA.001-REC.DATA.N to the application server 110 and optionally to the local database server 120. The webserver WEB.RDB may optionally (a.) communicate Ucount values to the application server 110 in step 3.08 of the method of FIG. 3, and/or (b.) effect downloads of record data REC.DATA.001-REC.DATA.N to the application server 110 and optionally to the local database server 120 in step 3.12 of the method of FIG. 3.

Within the remote server DBMS 140A, there are multiple remote server databases RDB.1-RDB.N, each having database records REC.001, REC.002, REC.003 and REC.N. These records REC.001-REC.N may be shared with other servers 110 & 120 of the network 100.

Figure 13A:
FIG. 13A is a block diagram of a first sample of a software data record stored within the remote database server, the local database server, and optionally the application server of FIG. 1.
Figure 13B:
FIG. 13B is a block diagram of a second sample of a software data record stored within the remote database server, the local database server, and optionally the application server of FIG. 1.
Figure 13C:
FIG. 13C is a block diagram of a third sample of a software data record stored within the remote database server, the local database server, and optionally the application server of FIG. 1.

FIG. 13A through FIG. 13C are separate block diagrams of a sampling records REC.001-REC.N stored within the remote database server 140, the local database server 120, and optionally the application server 110. An exemplary first database record REC.001 presented in FIG. 13A includes a first record identifier REC.ID.001, a first data element REC-.DATA.001 and a date-time stamp DTS.001.

An exemplary second database record REC.002 presented in FIG. 13B includes a second record identifier REC.ID.002, a second data element REC.DATA.002 and a date time stamp DTS.002.

An exemplary Nth database record REC.N presented in FIG. 13C presents an Nth record identifier REC.ID.N, an Nth data element REC.DATA.N and an Nth date time stamp DTS.N.

Figure 14A:
FIG. 14A is a block diagram of a Ucount request message wherein the application server of FIG. 1 requests a count of data records stored within a remote data base management system of the remote data base server of FIG. 1.

FIG. 14A is a block diagram of a unique exemplary first Ucount request message UREQ.001 wherein the application server 110 requests a Ucount of data records REC.001-REC.N stored within the remote DBMS 140A of the remote data base server 140 that are each associated with a date time stamp DTS.001-DTS.N falling within a specified time range defined by the current T0 value and the current TR value. The first Ucount message U.MSG.001 includes a unique first Ucount request message identifier UREQ.ID.001, a remote server network address RDB.ADDR of the remote database server 140 as a destination address, an application server network address APP.ADDR of the application server 110 as a sender address, a Ucount request command UREQ.COM, a T0 value and a TR value. Ucount request messages UREQ.001-UREQ.N may be messaged via the network 100 from the application server 110 to the remote database server 140 in various aspects and optional aspects of the invented method, including, but not limited to, step 2.07 of the process of FIGS. 2, 5 and 6.

Figure 14B:
FIG. 14B is a block diagram of an exemplary first Ucount provision message wherein the remote database server of FIG. 1 provides to the apps server of FIG. 1 a count of data records stored within the remote data base server of FIG. 1.

FIG. 14B is a block diagram of an exemplary first Ucount provision message UMSG.001 wherein the remote database server 140 provides to the apps server 110 a Ucount of data records REC.001-REC.N stored within the remote DBMS 140A of the remote data base server 140.

The first Ucount provision message UMSG.001 includes a unique exemplary first Ucount provision message identifier UMSG.ID.001, the application server network address APP.ADDR of the application server 110 as a destination address, the remote server network address RDB.ADDR of the remote database server 140 as a sender address, optionally the first Ucount request message identifier UREQ.ID.001 as previously messaged from the application server 110 to the remote database server 140, an exemplary first Ucount, optionally a T0 value and/or a TR value applied by the remote database server 140 to generate the exemplary first Ucount. Ucount provision messages UMSG.001-UMSG.N may be transmitted from the remote database server 140 to the application server 110 in various aspects and optional aspects of the invented method, including, but not limited to, step 3.08 of the process of FIG. 3. Ucount provision messages UMSG.001-UMSG.N may be received by the application server 120 in various aspects and optional aspects of the invented method, including, but not limited to, step 2.08 of the process of FIGS. 2, 4, 5 and 6.

Figure 14C:
FIG. 14C is a block diagram of an exemplary first data record download request message wherein the application server of FIG. 1 requests a plurality of data records stored within the remote data base server of FIG. 1.

FIG. 14C is a block diagram of an exemplary first data record download request message DR.REQ.001 wherein the application server 110 requests a plurality of data records REC.001-REC.N stored within the remote DBMS 140A of the remote data base server 140 that are each associated with a date time stamp DTS.001-DTS.N falling within a specified a time range defined by the current T0 value and the current TR value.

The first data record download request message DR.REQ.001 includes a unique first data record download request message identifier DR.REQ.ID.001, the remote server network address RDB.ADDR of the remote database server 140 as a destination address, the application server network address APP.ADDR of the application server 110 as a sender address, a data record download request command DR.COM, a T0 value and a TR value. One or more data record download request messages DR.REQ.ID.001-DR.REQ.ID.N may be sent from and by the application server 110 in various aspects and optional aspects of the invented method, including, but not limited to, step 2.12 of the process of FIG. 2, and step 4.12 of the process of FIG. 4. One or more data record download request messages DR.REQ.ID.001-DR.REQ.ID.N may be received by the remote server 140 in various aspects and optional aspects of the invented method, including, but not limited to, step 3.10 of the process of FIG. 3.

Figure 14D:
FIG. 14D is a block diagram of an exemplary first data record download message wherein the remote database server of FIG. 1 provides a plurality of data records to the application server of FIG. 1.

FIG. 14D is a block diagram of an exemplary first data record download message DLOAD.001 wherein the remote database server 140 provides to the application server 110 a plurality of data records REC.001-REC.N stored within the remote DBMS 140A of the remote data base server 140 that are each associated with a date time stamp DTS.001-DTS.N falling within a specified a time range defined by the current T0 value and the current TR value.

The first data record download message DLOAD.001a unique first data record download message identifier DLOAD.ID.001, the application server network address APP.ADDR of the application server 110 as a destination address, the remote server network address RDB.ADDR of the remote database server 140 as a sender address, and a plurality of data records REC.001-REC.N.

One or more data record download messages DLOAD.001-DLOAD.N may be transmitted by the remote database server 140 to the application server 110 in various aspects and optional aspects of the invented method, including, but not limited to, step 3.12 of the process of FIG. 3. One or more data record download messages DLOAD.001-DLOAD.N may be received by the application server 110 in various aspects and optional aspects of the invented method, including, but not limited to, step 2.12 of the process of FIG. 2 and step 4.12 of the process of FIG. 4.

Figure 14E:
FIG. 14E is a block diagram of an exemplary first data record download transferal message wherein the application server of FIG. 1 provides a plurality of data records to the local database server of FIG. 1.

FIG. 14E is a block diagram of an exemplary first data record download transferal message TLOAD.001 wherein the application server 110 provides to the local database server a plurality of data records REC.001-REC.N received by the application server 110 from the remote database server 140.

The first data record download transferal message TLOAD.001 includes a unique first data record download transferal message identifier TLOAD.ID.001, a local database server network address LDB.ADDR of the local database server 120 as a destination address the application server network address APP.ADDR of the application server 110 as a sender address, and a plurality of data records REC.001-REC.N.

One or more data record download transferal messages TLOAD.001-TLOAD.N may be transmitted by the application server 110 and received by the local data base server 120 in various aspects and optional aspects of the invented method, including, but not limited to, step 2.13 of the processes of FIG. 2, FIG. 5, and FIG. 6, and step 4.13 of FIG. 4.

Figure 15:
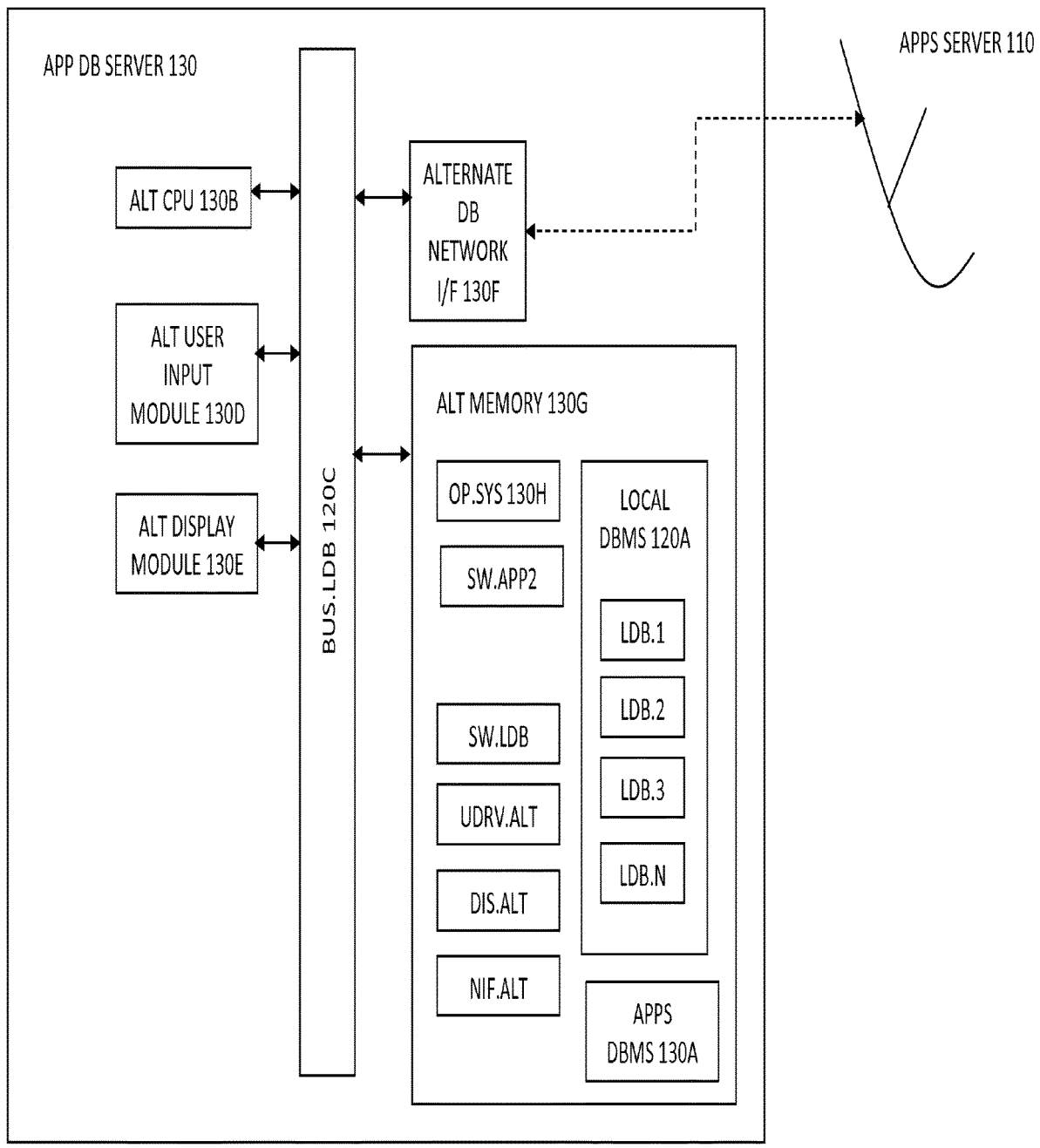
FIG. 15 is a block diagram of the alternate application database server of FIG. 1.

Referring now generally to the Figures and particularly to FIG. 15, FIG. 15 is a block diagram of the apps DB server 130, wherein the apps DB server 130 comprises the local DBMS 120A and an alternate application server software SW.APP2.

The alternate application server software SW.APP2 is adapted to enable the apps DB server 130 bi-directionally communicate with both the native local DBMS 120A and the remote server 140 to practice the aspects of the processes of FIG. 2, FIG. 4, FIG. 5, and FIG. 6 with the variation that the local DBMS 120A is updated by the receipt of data records REC.001-REC.N in step 2.13 of the processes of FIG. 2, FIG. 5, and FIG. 6, and step 4.13 of FIG. 4

More particularly, the alternate application server software SW.APP2 is adapted to enable the apps DB server 130 to provide the functionality of the local database server 120 in addition to the functionality of the application server 110 and thereby provide the dual functionality of both the local database server 120 and the application server 110 in a same computational device.

The apps DB server 130 alternate further includes an alternate DB central processing unit 130B ("CPU 130B") that is bi-directionally communicatively coupled by an alternate internal communications bus 130C with (a.) an optional alternate user input module 130D that accepts input, e.g., information and commands, from a user, (b.) an optional alternate video display module 130E that provides visual information rendering output, (c.) an alternate network interface 130F that bi-directionally communicatively couples the apps DB server 130 with the remote database server 140, and (d.) an alternate system memory 130G.

Stored within the alternate server system memory 130G, are the apps DBMS 130A, an alternate database server operating system software OP.SYS 130H, the alternate application server software SW.APP2, an optional alternate server user module driver UDRV.APP, an optional alternate server display driver DIS.APP, and an alternate server network interface driver NIF.APP that enables the alternate server network interface 130F to bi-directionally communicatively couple the alternate database server 130 with the application server 110.

The alternate application server software SW.APP2 enables the alternate database server 130 to execute, perform and instantiate aspects of the invented method as disclosed within FIGS. 2 through 6 and accompanying descriptions. The optional alternate user input module driver UDRV.APP enables the optional alternate user module 130D to input information and commands entered by a user into the apps DB server 130. The alternate network interface driver NIF.APP enables the alternate network interface module 130F to bi-directionally communicatively couple the apps DB server 130 with the remote database server 140.

It is understood that the indicator N of the FIGS. 8 through 13 represent an arbitrarily large number that has no relevance nor relationship to the value N of step 2.08 of the methods of FIG. 2, FIG. 4, FIG. 5 and FIG. 6.

Referring generally to the figures and particularly to FIG. 16, this is a flowchart of one preferred embodiment of the invented method. For the purposes of describing FIG. 16, the following index references are used. The index 001 refers to the first record in the remote database server 140. The index I-1 refers to the last record already transferred to the local database server 120 and therefore I is the index of the first record to transfer from the remote database server 140. The index J refers to the index of the last record transferred to from the remote server 140 to the local database server 120 for a given block. The index N refers to the index of the last record in the remote database server 120 at the current time of access.

Starting at step 16.00, the application server 110 begins its work. At step 16.02, it develops an initial estimate of the ending timestamp DTS.J that governs the transfer of records REC.I-REC.J from the remote database server 140 to the local database server 120.

If there are no prior system statistics on which to base the estimate of DTS.J, this estimate may be made using the procedure outlined in U.S. Pat. No. 9,754,001, for example. The initial estimate need not be correct or accurate, as the method described herein is self-correcting. Ideally, this initial estimate should be an accurate one. In the common case where prior system statistics are available, this estimate may be made on the basis of the immediate or cyclic behavior of prior system statistics.

Comprised also in step 16.02 is the determination of the ending timestamp DTS.I-1 of the local database 120 which serves as a determination of the starting timestamp DTS.I of the query. Either this value is stored internally to and retrieved by the application server 110 upon initialization or it may be retrieved by making a separate query to the local database 120. Once an estimate of the ending timestamp DTS.J has been made, the application server 110 proceeds to perform step 16.04, where a database query is formed from the modified ending timestamp DTS.I of the local database 120 and the estimated ending timestamp DTS.J that should be used in the query. Once the query is formed, it is made to the remote database server 140.

Proceeding to step 16.06, results are received from the remote database server 140 by the application server 110. Proceeding to step 16.08, if results have been received successfully, the application server 110 proceeds to perform step 16.12, but if the transfer failed because too many records REC.I-REC.J were requested, the application server proceeds to perform step 16.10. The query to the remote database server 140 may fail for reasons unrelated to requesting too many records REC.I-REC.J, for example, loss of network connectivity. In this event, there are separate recovery methods employed that lie outside the scope of this invention and are therefore not included on this flowchart.

At step 16.10, the query and retrieval of results have failed due to too many records REC.I-REC.J being requested. The invented method assumes that the eventuality embodied by step 16.10 would not be frequent enough to significantly affect system performance. If a partial response was received from the remote database server 140 back in step 16.06, these statistics could be used to refine the estimate of the ending timestamp DTS.J made either in step 16.02 or step 16.16 to form a new query for the application server to perform in a revised step 16.04. Alternatively, since step 16.10 would not be arrived at frequently in normal operation, a cruder method of estimation such as dividing the time interval between the original timestamps DTS.I and DTS.J by a factor could also be employed.

At step 16.12, the query and subsequent retrieval of results from the remote database server 140 have been successful. Two products of this success are the number of records actually received UCOUNT and the records REC.I-REC.J themselves. The former gives us a new data point worth of system statistics on which to base future ending timestamp estimates DTS.J. The latter may be transferred to the local database server 120. This transfer may be a transfer of records in bulk or a transfer of one record at a time.

At step 16.14, if the latest estimated ending timestamp DTS.J used in the previous successful query is greater than or equal to the present moment, the application server 110 has retrieved all records REC.I-REC.N stored in the remote database server 140 up until the query was processed, and the application server 110 is done with the transfer and proceeds therefore to the end of the algorithm and flowchart at 16.18.

If, however, more records REC.J+1-REC.N may exist in the remote database server 140 that were recorded between the previously estimated ending timestamp DTS.J and the present moment, the application server 110 in step 16.16 may employ a wide range of algorithms for estimating the next ending timestamp DTS.J so as to recover an optimally efficient number of records REC.I-REC.J from the remote database server 140 using the next query at step 16.04.

One preferred embodiment of this algorithm is to estimate the next time interval i0 and thus the next ending timestamp DTS.J by dividing the desired number of records rS to receive by the number of records actually received in the previous successful query r1 and multiplying this result by the time interval used in the previous successful query i1. This entire quantity is then multiplied by a factor k generally less than one to assure the next query will almost always succeed. Expressed as a formula, this paragraph is:

$$i0=(rS/r1)*i1*k$$

where:
i0 is the next estimated time interval
rS is the desired number of records
r1 is the number of records received in the previous successful query
i1 is the timestamp interval used by the previous successful query
k is the reduction factor that weights the estimate towards success Another preferred embodiment of this algorithm is to estimate the next time interval i0 and thus the next ending timestamp DTS.J by subtracting the number of records received in the formerly previous successful query r2 from twice the number of records received in the previous successful query r1, using this quantity to divide the desired number of records rS, and multiplying that result by the formerly previous timestamp interval of the successful query i2 subtracted from twice the previous timestamp interval of the successful query i1. This entire quantity is then multiplied by a factor k generally less than one to assure the next query will almost always succeed. Expressed as a formula, this paragraph is:

$$i0=(rS/(2*r1-r2))*(2*i1-i2)*k$$

where additionally:
r2 is the number of records in the former previous successful query
i2 is the timestamp interval used by the former previous successful query This second preferred embodiment introduces the use of multiple previous quantities to determine trends in the number of records per timestamp interval, thus providing a more accurate estimate of the ideal next ending timestamp DTS.J. Analyzing and employing these trends could be expressed as using the approximate derivative of the previous query behavior as a factor in a linear filter to improve the estimate. Since the application server gathers discrete quantities, the more accurate description would be the Z-transform of the previous query behavior followed by its use as factors in a digital filter.

Another way to think of this is that each successful query gives us an average time interval per record retrieved by that query, and this can be thought of like a "density" of queries, except not density like mass per unit volume, but instead "density" in terms of time period per record. By using these successive "density" measurements in a digital filter, a system can be built that effectively exploits the values and trends embodied in previous measurements to more accurately predict the behavior of the next transaction.

A third preferred embodiment would be to consider the records received divided by timestamp intervals of several previous successful queries as data points to perform the computation in the Z-transform domain of a digital filter tuned to the transaction behavior and other behavior of the database servers in the system. Expressed as a formula, this paragraph is:

$$i0=k1*i1/r1+k2*i2/r2+\ldots+kN*iN/rN$$

where additionally:
k1 ... kN are the coefficients of the digital filter
i1 ... iN are the timestamp intervals of the N previous successful queries
r1 ... rN are the numbers of records of the N previous successful queries Database transactions may also exhibit regular cyclic behavior on daily, weekly, or other relevant time intervals which could be used as a sole basis or an added basis by which to predict the immediate future behavior of the system and thus form the next estimated ending timestamp DTS.J. Fourier transform or other methods could be employed to automatically distinguish and exploit these cyclical patterns.

Also, system variations other than transactions per time interval to the remote database server 140 may serve as a basis to modify this estimation function. For example, the ideal number of records to transfer could vary based on varying network transfer rates between the remote database server 140 and the application server 110. Having the number of desired records vary on this basis in the above formulas provides another variation of each of these algorithms.

Referring generally to the figures and particularly to FIG. 17, this is a flowchart of one preferred embodiment of step 16.12 of FIG. 16 where the records transferred to the local database server of FIG.1 are transferred one record at a time.

Once the application server 110 has received the entire block of records to be transferred in step 16.06 and has verified that the receipt of the block of records was successful in step 16.08, the application server 110 may proceed to the preferred embodiment of step 16.12 described by FIG. 17. This process begins at step 17.00 and proceeds to step 17.02 where the application server 110 identifies the first record of the block of records to be transferred to the local database server 120 and attempts the transfer of this record.

At step 17.04, the application server 110 receives a response from the local database server that allows it to determine whether the transfer of the record was successful. If the transfer of the record was not successful, the application server 110 proceeds to step 17.06, where the transfer is retried, or other remedies to the transfer failure are sought, up to and including aborting and failing the transfer of the entire block.

If the transfer of the record is successful, the application server 110 proceeds to step 17.08, where it determines whether there are any records in the block that remain to be transferred. If there are records that remain, the application server 110 proceeds to step 17.10, where it identifies and attempts to transfer the next record in the block. From here, the application server 110 returns to step 17.04, this time to determine whether this next record has been successfully transferred to the local database server 120.

In the case where all records in the block have been successfully transferred from the application server 110 to the local database server 120, the application server 110 proceeds to step 17.12, where this detailed preferred embodiment of step 16.12 of FIG. 16 concludes.

Referring generally to the figures and particularly to FIG. 18, this is a diagram of an electronic communications network comprising a remote source database server, an application server, and a remote target database server. This diagram is an alternate preferred embodiment of the system of the invented method where instead of a local database 120 as in FIG. 1, there is a remote target database 1820 that serves to fulfill all the functions described herein as being served by the local database server 120 in FIG. 1. The network 1800 in FIG.18 may comprise or be comprised within the network 100 in FIG.1. The remote source database server 1840 in FIG. 18 may comprise or be comprised within the remote database server 140 in FIG. 1. The application server 1810 in FIG. 18 may comprise or be comprised within the application server 110 in FIG. 1.

Referring to FIG. 19, this is a flowchart of one preferred embodiment of block 16.12 of FIG. 16 where the records transferred from the remote database server 140 to the local database server 120 of FIG.1 are instead transferred from the remote source database server 1840 to the remote target database server 1820 of FIG. 18, specifically a web service platform, and are transferred one record at a time. Note that this operation is performed by the application server 1810 of FIG. 18 may comprise or be comprised within the application server 110 of FIG. 1.

To start the operation of FIG. 19, the application server 1810 proceeds from step 19.00 to step 19.02, where it performs any initialization of the web database platform 1820 interface, identifies the first record of the block to be transferred, and attempts to transfer it.

Note that the web database platform 1820 interface can be one where each session consists of at most one record transferred, or there may be the added capability to define a session comprising the entire block of records, and possibly additionally the capability of committing the entire block of records when the transfer of the last record is complete at step 19.12 or rolling back the entire operation comprising FIG. 19 if there is an unrecoverable failure. Minimally, in the case where rollback is not available on the web database platform 1820 interface, there would at least be the ability to delete a record so that the application server 1810 would be able to emulate the rollback capability.

At step 19.04, the application server determines whether the record was successfully transferred to the web database platform 1820. In the case the record failed to be transferred, the application server 1810 proceeds to step 19.06, where methods to recover from record level transfer failures are handled by the application server 1810, including retrying the record transfer.

If the application server 1810 determines in step 19.04 that the record transfer succeeded, the application server 1810 proceeds to step 19.08, where it checks to see whether the final record of the block was just successfully transferred. If there are more records to transfer, the application server 1810 proceeds to step 19.10, where it attempts to identify and transfer the next record in the block to the web database platform 1820. For here the application server 1810 returns to step 19.04, this time to determine whether this next record was successfully transferred. When no more records remain to be transferred to the web database service platform 1820, the application server 1810 proceeds to step 19.12, completing the algorithm described by FIG. 19.

Referring now generally to the Figures and particularly to FIG. 20, FIG. 20 is a block diagram of the source database server 1840 of FIG. 18.

A source database server operating system software OP.SYS 1840H of the source database system server 1840 may be selected from freely available, open source and/or commercially available operating system software, to include but not limited to Red Hat Linux™ marketed by Red Hat, Inc. of Raleigh, N.C. or derivative operating system, such as CentOS Linux open source operating system software; the Windows 10™ operating system as marketed by Microsoft Corporation of Redmond, Wash.; or the MacOS X™ operating system or iPhone iOS™ as marketed by Apple, Inc. of Cupertino, Calif.

The source server 1840 further includes a source server central processing unit 1840B ("CPU 1840B") that is bi-directionally communicatively coupled by a source internal communications bus 1840C with (a.) an optional source user input module 1840D that accepts input, e.g., information and commands, from a user, (b.) an optional source video display module 1840E that provides visual information rendering output, (c.) a source network interface 1840F that bi-directionally communicatively couples the source database server 1840 with the target database server 1820 and application server 1810, and (d.) a source system memory 1840G.

Referring now generally to the Figures and particularly to FIG. 21, FIG. 21 is a block diagram of the target database server 1820 of FIG. 18.

A target database system server operating system software OP.SYS 1820H of the target database system server 1820 may be selected from freely available, open source and/or commercially available operating system software, to include but not limited to Red Hat Linux™ marketed by Red Hat, Inc. of Raleigh, N.C. or derivative operating system, such as CentOS Linux open source operating system software; the Windows 10™ operating system as marketed by Microsoft Corporation of Redmond, Wash.; or the MacOS X™ operating system or iPhone iOS™ as marketed by Apple, Inc. of Cupertino, Calif.

The target database server 1820 further includes a target server central processing unit 1820B ("CPU 1820B") that is bi-directionally communicatively coupled by a target internal communications bus 1820C with (a.) an optional target user input module 1820D that accepts input, e.g., information and commands, from a user, (b.) an optional target video display module 1820E that provides visual information rendering output, (c.) a target network interface 1820F that bi-directionally communicatively couples the target server 1820 with the source database server 1840 and application server 1810, and (d.) an target system memory 1820G.

Referring now generally to the Figures and particularly to FIG. 22, FIG. 22 is a block diagram of the application server 1810 of FIG. 18.

An application server operating system software OP.SYS 1820H of the application server 1820 may be selected from freely available, open source and/or commercially available operating system software, to include but not limited to Red Hat Linux™ marketed by Red Hat, Inc. of Raleigh, N.C. or derivative operating system, such as CentOS Linux open source operating system software; the Windows 10™ operating system as marketed by Microsoft Corporation of Redmond, Wash.; or the MacOS X™ operating system or iPhone iOS™ as marketed by Apple, Inc. of Cupertino, Calif.

The application server 1810 further includes an application central processing unit 1810B ("CPU 1820B") that is bi-directionally communicatively coupled by an application internal communications bus 1810C with (a.) an optional application user input module 1820D that accepts input, e.g., information and commands, from a user, (b.) an optional application video display module 1820E that provides visual information rendering output, (c.) an application network interface 1820F that bi-directionally communicatively couples the application server 1810 with the source database server 1840 and target database server 1820, and (d.) an application system memory 1810G.

Referring now generally to the Figures and particularly to FIG. 23, FIG. 23 is a block diagram of a system 2300 hosting all server aspects of the invented method on the same single computer. It is well known the art that a single computing system may operate as multiple 'servers' at once, and that the term 'server' incorporates both hardware and software aspects. In using the same computing device in multiple server capacities, one is simply advised to ensure that the multiple server functions sharing the same system are configured such that they never risk overwriting each other's files or intercepting each other's communications, and that the system has sufficient memory space and processing power to handle the load.

A server operating system software OP. SYS 2300H of the server 2300 may be selected from freely available, open source and/or commercially available operating system software, to include but not limited to Red Hat Linux™ marketed by Red Hat, Inc. of Raleigh, North Carolina or derivative operating system, such as CentOS Linux open source operating system software; the Windows 10™ operating system as marketed by Microsoft Corporation of Redmond, Wash.; or the MacOS X™ operating system or iPhone iOS™ as marketed by Apple, Inc. of Cupertino, Calif.

The system 2300 further includes a central processing unit 2300B ("CPU 2300B") that is bi-directionally communicatively coupled by a target internal communications bus 2300C with (a.) an optional target user input module 2300D that accepts input, e.g., information and commands, from a user, (b.) an optional target video display module 2300E that provides visual information rendering output, (c.) a network I/O module 2300F, and (d.) a system memory 2300G that includes all of the database management systems referenced herein such as the apps DBMS 1810A, source DBMS 1820A, target DBMS 1840A, and remote DBMS 140A, and the software including SW.APP, SW.SRC, SW.TGT, and SW.RMT required to host all of the server functions referenced herein. It should be noted that, in the case that all of the server functions are hosted on the same system, a connection to a network 1800 would be optional; though it should be noted also that network communication protocol such as SSH protocol allows a computer to 'contact itself' over a network 1800, and specification of port number or subdirectory as part of a scripted command is often a useful means for distinguishing between the multiple roles of a multitasking server.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a non-transitory computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based herein. Accordingly, the disclosure of the embodiments of the invention is intended to be illustrative, but not limiting, of the scope of the invention, which is set forth in the following claims.

The invention claimed is:

1. In an electronics communications network ("the network") comprising an application server and a source server, a computer-implemented method comprising:
  a. establishing a database management software ("DBMS") at the application server ("target server"), the DBMS comprising a target database of the target server, the target database storing information received from the source server;
  b. the target server sending a first update query to the source server, wherein the first update query requests updates of one or more records of an identifiable database accessible to the source server, and the first update query specifies a query limitation to all records of the identifiable database having a most recent value of an update date time stamp found from a first query start date time stamp and up to a first query stop date time stamp, wherein the first query start date time stamp and the first query stop date time stamp are displaced by a first query time interval;
  c. the source server receiving the first update query via the network;
  d. deriving a count of record updates received by the target server in response to the first update query;

e. deriving a date time interval value in view of the derived count of records and a pre-established preferred record count value; and
f. applying the date time interval value to establish a date time stamp variance limitation of a second update query, wherein a second query start date time stamp and a second query stop date time stamp are displaced by the date time interval value.

2. The method of claim 1, wherein the second query start date time stamp is equivalent to the first query stop date time stamp.

3. The method of claim 1, further comprising applying a reduction factor in the derivation of the date time interval value, whereby the date time interval value is lower in value than would result if the date time interval value were generated merely in view of the derived count of records and the pre-established preferred record count value.

4. The method of claim 1, further comprising the target server sending the second update query to the source server, wherein the second update query requests updates of one or more records of the identifiable database, and the second update query specifies a limitation of requesting only record updates of the identifiable database having a value of a most recent update date time stamp found in a range starting at the second query start date time stamp and extending up to the second query stop date time stamp, wherein the second query start date time stamp and the second query stop date time stamp are displaced by the date time interval value.

5. The method of claim 4, comprising:
g. the target server detecting a time out condition after sending of the second update query by the target server;
h. determining a date time stamp ("last date time stamp") of all records updates of the identifiable database received after the sending of the second update query, wherein the last date stamp indicates the most recent point of time of all the date time stamps of the records of the identifiable database received via the network after sending of the second update query;
i. deriving a following count of record updates of the identifiable database received by the target server in response to the first update query and prior to an initiation of the time-out condition and;
j. deriving a following date time interval value in view of the derived following count of records and a pre-established preferred record count value; and
k. applying the following date time interval value to establish a date time stamp variance limitation of a third update query, wherein a third query start date time stamp and a third query stop date time stamp are displaced by the following date time interval value.

6. The method of claim 5, further comprising applying a reduction factor in the derivation of the following date time interval value, whereby the following date time interval value is lower in value than would result if the following date time interval value were generated merely in view of the derived following count of records and the pre-established preferred record count value.

7. The method of claim 1, further comprising the derivation of a nominal record update quantity per unit time in view of a plurality of record update counts of record updates received in response to each of a plurality of update queries.

8. The method of claim 7, further comprising applying the nominal record update quantity per unit of time to calculate a nominal date time interval value to forecast a receipt of a pre-established number of record updates in response to a transmission of a new record update query, wherein a new update query specifies a new query limitation of requesting only records of the identifiable database having a value of a most recent update date time stamp found from a new query start date time stamp and up to a new query stop date time stamp, wherein the new query start date time stamp and the new query stop date time stamp are displaced by the nominal query time interval.

9. The method of claim 8, further comprising the target server communicating the new update query to the source server.

10. The method of claim 8, wherein the new query start date time stamp is equal to a most recent query stop date time stamp value of a most recently issued query of the plurality of update queries.

11. The method of claim 8, wherein the new query stop date time stamp is generated by adding the date time range value to a most recent query stop date time stamp value of a most recently issued query of the plurality of update queries.

12. The method of claim 1, wherein the derivation of the date time interval value includes a value limitation of date time range value to reduce a probability of the second record update request issued by the target server causing a time-out condition.

13. The method of claim 1, wherein a time-out condition is imposed by the source server in response to a generation of a response to receipt by the source server of the update query.

14. The computer implemented method of claim 1, wherein the target server and the DBMS are embodied in a same computational system.

15. The computer implemented method of claim 1, wherein the target server communicates with the source server from a first computational system and a local DBMS resides substantively within a second computational system, wherein responses to record update queries are downloaded from the source server to the second computational system and are stored within the local DBMS.

16. The computer implemented method of claim 1, wherein responses record update queries are provided to the target server by the source server as a web service.

17. The computer implemented method of claim 16 wherein the web service is distributed within the Internet.

18. The computer implemented method of claim 1, wherein the records are loaded into the target server DBMS either one record at a time or in bulk.

19. The computer implemented method of claim 1, wherein target server DBMS is comprised within a web service platform.

20. A computer implemented method comprising:
a. a source server providing a first plurality of responses to a target server in response to a first record update query;
b. the source server receiving a new record update query containing a new start date time stamp and a new end date time stamp, a new date time stamp derived by the target server in view of (1.) a pre-established record count value, and (2.) a plurality of record counts of a first plurality of responses received by the source server in response to the first plurality of record update queries; and
c. the source server downloading a new plurality of database record updates to the target server of record updates having no date time stamp value indicating a point in time later than the new date time stamp.

21. In a computational device comprising an application server and a source server, a computer-implemented method comprising:

a. establishing a database management software ("DBMS") at the application server ("target server"), the DBMS comprising a target database of the target server, the target database storing information received from the source server;
b. the target server sending a first update query to the source server, wherein the first update query requests updates of one or more records of an identifiable database accessible to the source server, and the first update query specifies a query limitation to all records of the identifiable database having a most recent value of an update date time stamp found from a first query start date time stamp and up to a first query stop date time stamp, wherein the first query start date time stamp and the first query stop date time stamp are displaced by a first query time interval;
c. the source server receiving the update query via the network;
d. deriving a count of record updates received by the target server in response to the first update query;
e. deriving a date time interval value in view of the derived count of records and a pre-established preferred record count value; and
f. applying the date time interval value to establish a date time stamp variance limitation of a second update query, wherein a second query start date time stamp and a second query stop date time stamp are displaced by the date time interval value.

\* \* \* \* \*